United States Patent
Mahaffey et al.

(10) Patent No.: US 11,902,274 B2
(45) Date of Patent: **\*Feb. 13, 2024**

(54) SYSTEM AND COMPUTER READABLE MEDIA ENABLING METHODS FOR PERMITTING A REQUEST AFTER VERIFYING KNOWLEDGE OF FIRST AND SECOND SECRETS

(71) Applicant: LOOKOUT, INC., Boston, MA (US)

(72) Inventors: Kevin Patrick Mahaffey, San Francisco, CA (US); Timothy Micheal Wyatt, Toronto (CA); Brian James Buck, Livermore, CA (US); Matthew Robert Baker, San Francisco, CA (US); Danielle Hewson Kingsley, San Francisco, CA (US); Elaine P. Teoh, San Francisco, CA (US); Marc William Rogers, Moraga, CA (US)

(73) Assignee: LOOKOUT, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,559

(22) Filed: Apr. 24, 2023

(65) Prior Publication Data
US 2023/0262050 A1 Aug. 17, 2023

Related U.S. Application Data

(60) Continuation of application No. 17/165,054, filed on Feb. 2, 2021, now Pat. No. 11,637,823, which is a
(Continued)

(51) Int. Cl.
*H04L 29/00* (2006.01)
*H04L 9/40* (2022.01)
*H04W 12/069* (2021.01)
(Continued)

(52) U.S. Cl.
CPC .......... *H04L 63/083* (2013.01); *H04L 9/0643* (2013.01); *H04L 9/3226* (2013.01);
(Continued)

(58) Field of Classification Search
CPC ... H04L 63/083; H04L 9/0643; H04L 9/3226; H04L 9/3271; H04L 63/0869; H04L 63/10; H04W 12/069; H04W 12/084
See application file for complete search history.

(56) References Cited

U.S. PATENT DOCUMENTS

2008/0307522 A1* 12/2008 Shoji ............... G06F 3/0622
726/21
2011/0202766 A1* 8/2011 Lerner .............. H04L 63/065
713/168
(Continued)

*Primary Examiner* — Ghazal B Shehni
(74) *Attorney, Agent, or Firm* — Dergosits & Noah LLP

(57) ABSTRACT

Systems and Computer Readable Media for enabling methods for multi-party authorization including a security component determining that a request for the performance of an action on a computing device is from a first party. The security component initiates transmissions to the computing device of first and second information indicating knowledge of first and second secrets provisioned on the computing device. The computing device, upon verifying the knowledge of first and second secrets, then permits the requested action.

20 Claims, 17 Drawing Sheets

Related U.S. Application Data continuation of application No. 16/575,140, filed on Sep. 18, 2019, now Pat. No. 11,050,736, which is a division of application No. 15/410,655, filed on Jan. 19, 2017, now Pat. No. 10,469,481, which is a division of application No. 14/583,501, filed on Dec. 26, 2014, now Pat. No. 9,602,508.

(60) Provisional application No. 62/051,230, filed on Sep. 16, 2014, provisional application No. 61/921,025, filed on Dec. 26, 2013.

(51) Int. Cl.
*H04W 12/084* (2021.01)
*H04L 9/06* (2006.01)
*H04L 9/32* (2006.01)

(52) U.S. Cl.
CPC ........ *H04L 9/3271* (2013.01); *H04L 63/0869* (2013.01); *H04L 63/10* (2013.01); *H04W 12/069* (2021.01); *H04W 12/084* (2021.01)

(56) References Cited

U.S. PATENT DOCUMENTS

| | | | | |
|---|---|---|---|---|
| 2012/0110651 A1* | 5/2012 | Van Biljon | ........... | H04L 63/101 |
| | | | | 709/201 |
| 2015/0143126 A1* | 5/2015 | Blom | ................... | H04L 63/062 |
| | | | | 713/171 |
| 2015/0318995 A1* | 11/2015 | Leggette | ............. | H04L 63/0435 |
| | | | | 713/181 |
| 2018/0343565 A1* | 11/2018 | Bacastow | ............. | H04W 12/06 |

* cited by examiner

SYSTEM AND COMPUTER READABLE MEDIA ENABLING METHODS FOR PERMITTING A REQUEST AFTER VERIFYING KNOWLEDGE OF FIRST AND SECOND SECRETS

CROSS-REFERENCE TO RELATED APPLICATIONS

This patent application is a continuation of U.S. patent application Ser. No. 17/165,054, filed Feb. 2, 2021, entitled "SYSTEM AND METHOD FOR PERMITTING A REQUEST AFTER VERIFYING KNOWLEDGE OF FIRST AND SECOND SECRETS," now U.S. Pat. No. 11,637,823 issued on Apr. 25, 2023, which is a continuation of U.S. patent application Ser. No. 16/575,140, filed Sep. 18, 2019, entitled "SYSTEM AND METHOD FOR PROCESSING A COMMAND BASED ON VERIFICATION INFORMATION AND A CHALLENGE TOKEN," now U.S. Pat. No. 11,050,736 issued on Jun. 29, 2021, which is a divisional of U.S. patent application Ser. No. 15/410,655, filed Jan. 19, 2017, entitled "SYSTEM AND METHOD FOR PERMITTING AN ACTION BASED ON VERIFICATION INFORMATION AND A CHALLENGE TOKEN," now U.S. Pat. No. 10,469,481, granted on Nov. 5, 2019, which is a divisional of U.S. patent application Ser. No. 14/583,501, filed Dec. 26, 2014, entitled "SYSTEM AND METHOD FOR PERFORMING AN ACTION BASED UPON TWO-PARTY AUTHORIZATION," now U.S. Pat. No. 9,602,508, granted on Mar. 21, 2017, which claims priority to U.S. provisional patent application 61/921,025, filed Dec. 26, 2013, entitled "SYSTEM AND METHOD FOR PERFORMING AN ACTION BASED UPON TWO-PARTY AUTHORIZATION" and to U.S. provisional patent application 62/051,230, filed Sep. 16, 2014, entitled "SYSTEM AND METHOD FOR INSTITUTING A TWO-PARTY AUTHORIZATION ACCESS REQUIREMENT," which are related to the following U.S. patent applications: U.S. patent application Ser. No. 13/916,484, entitled "MOBILE DEVICE PERSISTENT SECURITY MECHANISM" (now abandoned), and co-pending U.S. application Ser. No. 14/297,524, entitled "METHOD AND SYSTEM FOR RENDERING A STOLEN MOBILE COMMUNICATIONS DEVICE INOPERATIVE," which are all hereby incorporated by reference along with all other references cited in this application.

TECHNICAL FIELD

The present invention relates to the field of information technology, including, more particularly, to systems and methods for mobile device security.

BACKGROUND OF THE INVENTION

The performance of certain types of actions can have serious consequences. For such actions, it may be desirable to have two or more authorized parties confirm the action before the action is permitted. In other instances, situations may arise in which the possessor, location, or condition of a mobile device may be in doubt. For such situations, it may be desirable to require that two or more authorized parties confirm the action or that access to the device is to be granted. And, in such situations, it should be the actual authorized parties that confirm the action. Thus, it is desirable to authenticate the parties.

An example of a representative action is the triggering of a kill switch on a computing device. Such an action becomes especially serious when the action may have the potential to inadvertently (or maliciously) disable many hundreds, thousands, or even millions of devices. For example, if there is the ability to disable a device, and that functionality is controlled by a controller, and that one controller manages, for example, all the devices in the United States of America, that presents a very large and attractive target for terrorists.

It can also be of concern to have a single controller that has privilege over a large number of devices—especially if that privilege extends to physically disabling device hardware. Many enterprises have this ability. It would be useful to have a system that could prevent the inadvertent or malicious rendering of large numbers of computing devices physically inoperable.

Regarding access to the device, it is arguable that a user would notice the loss of a mobile device, such as a cell phone, before they notice the loss of their wallet or purse. But simply noticing that a mobile device is missing does not guarantee that the proper user will recover the mobile device. At best, the loss of the mobile device will be inconvenient, particularly now that mobile devices are so much more than communication devices. At worst, the loss of the mobile device can result in expenses ranging from replacing the device itself, to expenses incurred through the actions of whatever party obtained the mobile device. Strangely, even though the consequences of losing a mobile device are well-known, many users do not avail themselves of even the first line of security—a password that locks the device. Furthermore, there are situations where after a device is lost or stolen, it may be uncertain that the next possessor or attempted user of the device is actually a proper user of the device. In such situations, it would be useful to have a method for preventing the use of the device until it can be verified that the attempted user of the device is a proper user of the device.

BRIEF SUMMARY OF THE INVENTION

In an embodiment a computing device creates verification information and a challenge token and sends the verification information and token to a server. The server receives a command and authentication information and uses the verification information from the computing device to verify the authentication information. If the authentication information is verified, the server then creates authentication credentials based on the authentication information and the challenge token and sends the credentials and token to the computing device. The computing device then determines whether the authentication credentials are valid. If the authentication credentials are valid, the computing device processes the command.

In an embodiment, an action is permitted to be performed on a computing device only after the action has been authorized by two or more authorized parties.

In an embodiment, access to a device is permitted only after the access has been approved by two or more authorized parties, where one of the authorized parties may be the possessor of the device using a password.

In an embodiment, a security component receives a request from a party to initiate an action on a computing device. The action requires the authentication of a first party and a second party before the action is allowed to be initiated on the computing device. The first and second parties are authenticated and upon receipt of or notice of the successful authentications of the first and second parties by the security component, the security component allows the requested action to be initiated on the computing device. The allowing the requested action to be initiated may include sending the request to the computing device, and it may include sending notice of the successful authentications of the first and second parties to the computing device.

In an embodiment, the requested action disables the device, or a subset of functions of the device.

In an embodiment, a security component receives a notification regarding a computing device. In response to the notification, the security component institutes a two-party authorization protocol for using the computing device. The security component instructs the computing device to deny use of at least one computing device function until the computing device receives instructions from the security component to permit the use of the at least one computing device function. The security component receives an indication from the computing device that an attempt has been made to use the at least one computing device. The security component transmits a message to a set of designated authorizing parties, the message regarding whether to permit the attempted use. The security component receives authorizations from first and second parties. After receiving the first and second authorizations, the security component transmits instructions to the computing device that instruct the computing device to permit the use of the at least one computing device function.

Other objects, features, and advantages of the present invention will become apparent upon consideration of the following detailed description and the accompanying drawings, in which like reference designations represent like features throughout the figures.

DETAILED DESCRIPTION

In an embodiment, an action is permitted to be performed on a computing device only after the action has been authorized by two or more authorized parties. Also, in an embodiment, access to a device is permitted only after the access has been approved by two or more authorized parties, where one of the authorized parties may be the possessor of the device using a password. In any of these embodiments, an authorized party may be tested, or have to prove that the purportedly authorized party is, in fact, authentic. In certain instances the mere response to a request may be all that is requested from a party in the way of authorization. In such instances, the authentication of a purportedly authorized party may amount to, effectively, the authorization. Still, in other instances, a positive act of authorization may be asked for even after a party is authenticated. Thus, methods for authentication may be interchangeable with, complementary to, or necessary additions to methods for authorization, and vice versa. For those reasons, in the following discussion and unless otherwise expressly stated, discussion directed to authorization should also be understood to apply to authentication, and vice versa.

Figure 1:
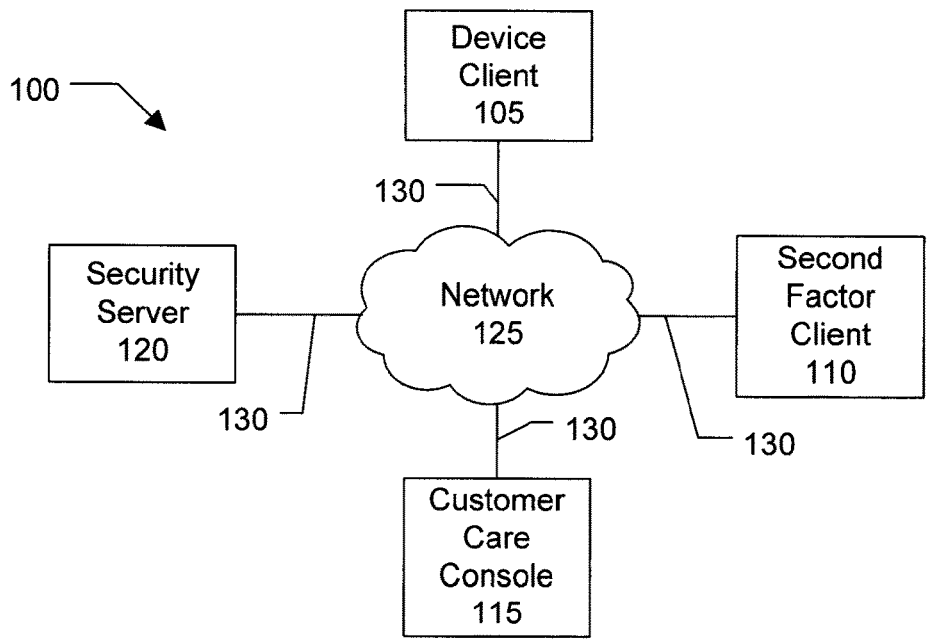
FIG. 1 shows a simplified block diagram of a mobile device persistent security system implemented in a distributed computing network connecting a server, customer care console, and clients.

FIG. 1 is a simplified block diagram of a distributed computer network 100 incorporating an embodiment of a system for a mobile device persistent security mechanism. Computer network 100 includes a number of client systems 105 and 110, and a security server system 120 (or "server system" or "security system"), and a customer care console server system 115, coupled to a communication network 125 via a plurality of communication links 130. In particular, there is a device client 105, which is the subject of the mobile device persistent security mechanism, and a plurality of second factor clients 110 (or "second factors 110," also "second factor" is interchangeable with "two-party" in this disclosure), which may be a mobile device or other computing device such as a PC, or in some embodiments a communications device such as a land-line telephone. Customer care console 115 is a Web or application-based user interface system that facilitates interaction with a security system 120 providing security services for device 105. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, a intranet, a private network, a public network, a switched network, a peer-to-per network, a meshed network, and network fabric, and combinations of these, and the like.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one security system 120 may be connected to communication network 125. As another example, a number of client systems 105 and 110 may be coupled to communication network 125 via an access provider (not shown) or via some other server system. There may be more than one customer care console server system 115 connected to communication network 125. An instance of a security server 120 and a customer care console server system 115 may be part of the same or different hardware servers. An instance of a security server 120 may be operated by a security provider different from an organization operating a customer care console 115, or may be operated by the same organization operating a customer care console 115. A customer care console 115 may be operated by a mobile carrier or mobile network operator, or by an insurance company providing insurance covering device client 105, or by a security provider, or by a call center supporting an insurance company or a carrier or network operator or security provider or by an enterprise for use with devices operated by employees or contractors for the enterprise.

Client systems 105 and 110 typically request information from a server system which provides the information. Server systems by definition typically have more computing and storage capacity than client systems. However, a particular computer system may act as both a client and a server depending on whether the computer system is requesting or providing information. Aspects of the system may be embodied using a client-server environment or a cloud-cloud computing environment.

Security server 120 is responsible for receiving information requests from client systems 105 and 110, performing processing required to satisfy the requests, and for forwarding the results corresponding to the requests back to the requesting client system. The processing required to satisfy the request may be performed by security server system 120 or may alternatively be delegated to other servers connected to communication network 125. Security server 120 may be an intermediary in communications between a customer care console 115 and client systems 105 and 110, or a customer care console 115 may communicate directly with client systems 105 and 110.

Client systems 105 and 110 enable users to access and query information or applications stored by security system 120. Some example client systems include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™ or any device running the Apple iOS®, Android® OS, Google Chrome® OS, Symbian OS®, Windows Mobile® OS, Windows Phone, BlackBerry® OS, Embedded Linux, Tizen, Sailfish, webOS, Palm OS® or Palm Web OS®; or wearable devices such as smart watches, smart fitness or medical bands, smart glasses, smart jewelry, or smart clothing; or sessile devices (usually stationary devices but which are capable of being carried or moved) such as Internet of Things devices; or devices that are capable of movement or are carried by or part of machines that are capable of movement, such as vehicles or robots or autonomous vehicles, e.g., unmanned aerial vehicles (UAVs), autonomous underwater vehicles (AUVs), unmanned ground vehicles (UGVs), or unmanned surface vehicles (USVs).

In embodiments, device 105, second factor client 110, customer care console 115, and security server 120 may run a second factor application. That is, a second factor application may be an application installed on a second factor client and dedicated to handling second factor related communications, or an instance of the security application (on any client or server or console) that can support second factor communications, or any other communications application that is being employed for the purposes of communications regarding second factor processing.

Figure 2:
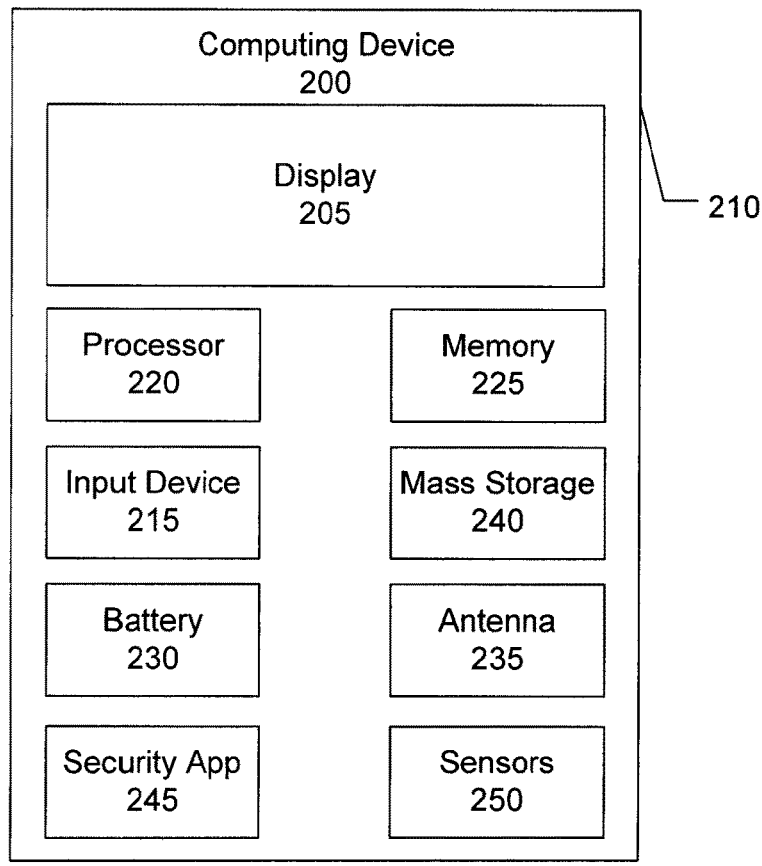
FIG. 2 shows a more detailed diagram of an example of a device client of the mobile persistent security system.

FIG. 2 shows an example of a computer system such as a client system. In an embodiment, a user interfaces with the system through a client system, such as shown in FIG. 2. Mobile client communication or portable electronic device 200 includes a display, screen, or monitor 205, housing 210, input device 215, sensors 250, and a security application 245. Housing 210 houses familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, gestural interface (contact or non-contact gestures), biometric input sensors, or combinations of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The system may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use. Other configurations of subsystems suitable for use will be readily apparent to one of ordinary skill in the art. For example, in an embodiment, the computing device is mobile communication device such as a smartphone or tablet computer. Some specific examples of smartphones include the Droid Incredible and Google Nexus One®, provided by HTC Corporation, the iPhone® or iPad®, both provided by Apple, BlackBerry Z10 provided by BlackBerry (formerly Research In Motion), and many others. The computing device may be a laptop or a netbook. In another embodiment, the computing device is a non-portable computing device such as a desktop computer or workstation.

A feature of the system requires two parties, such as second factor client 110 and customer care console 115, to authorize an attempted access of device client 105 that has been reported lost or stolen to customer care console 115. In an implementation, there is a security server, first and second parties, and authorizations that the first and second parties provide that authorize and allow an attempted access of device client 105 after device client 105 has been reported lost or stolen to the security server 120 (alternately known as a "cloud controller" or "controller," any of which may run a security component such as security app 245). It should be appreciated that there could be n+1 parties. In other words, there may be any number of parties that are all required to authorize an attempted access.

Figure 3:
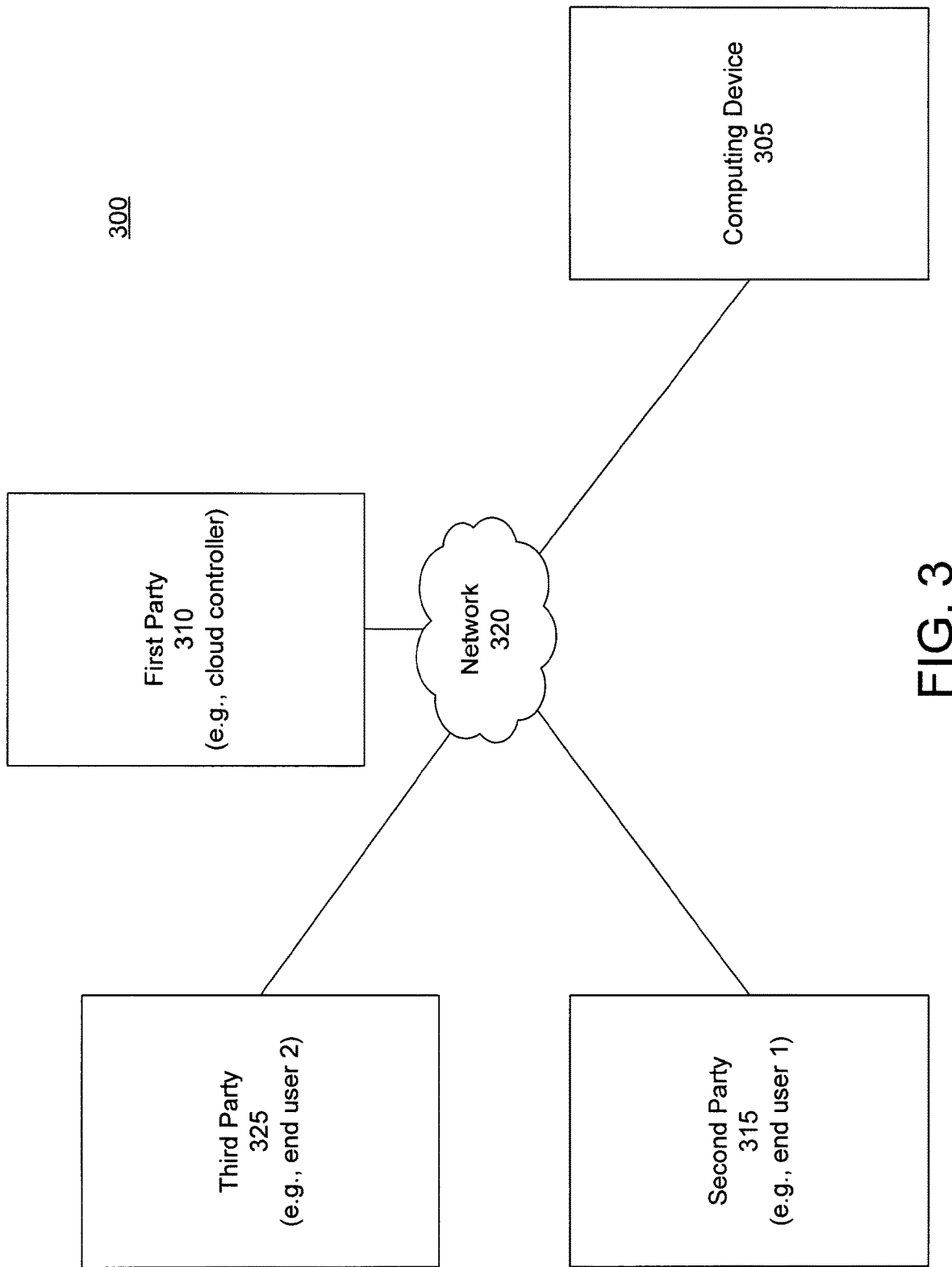
FIG. 3 shows a simplified block diagram of a system for multiparty authentication and authorization.
Figure 4:
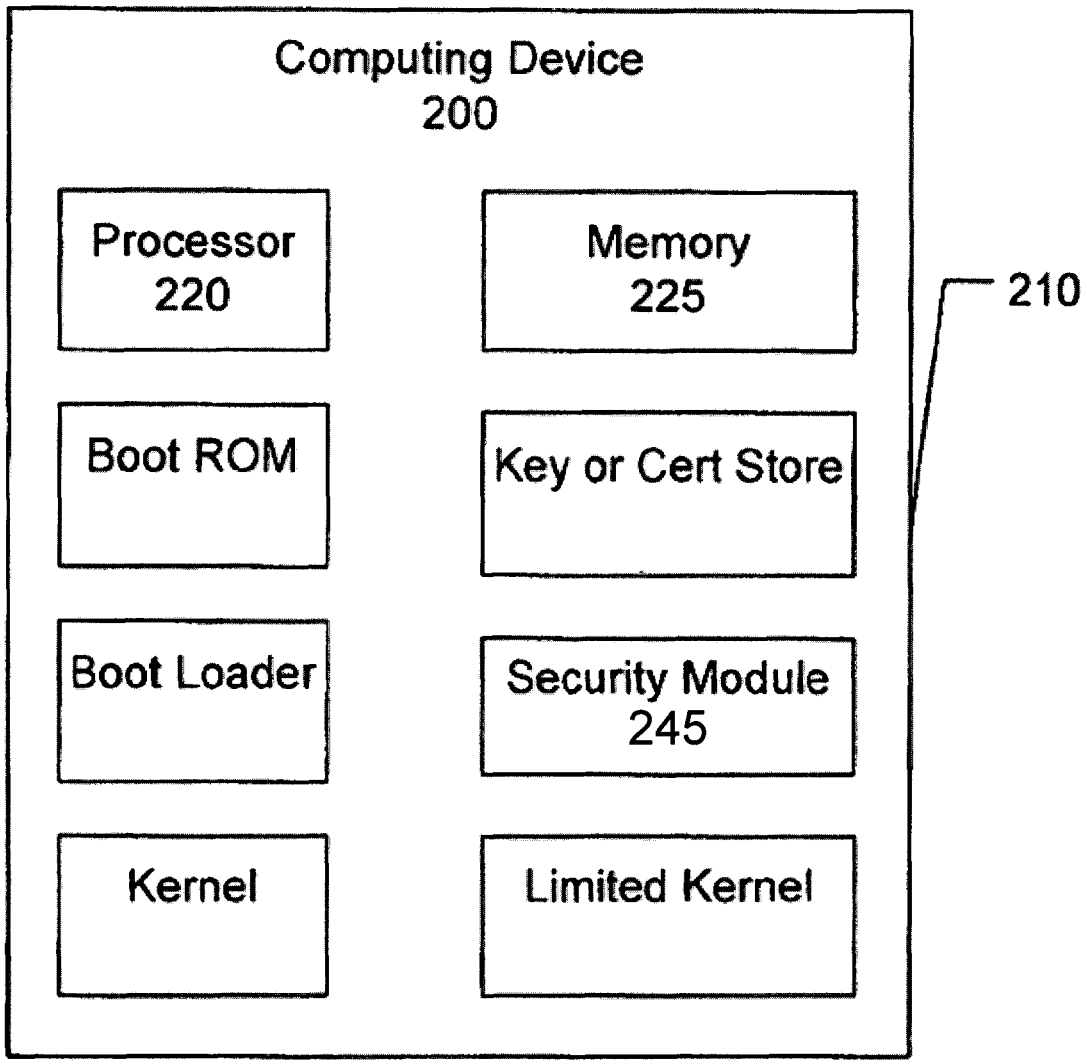
FIG. 4 shows another example of a client in an embodiment of the system.
Figure 5:
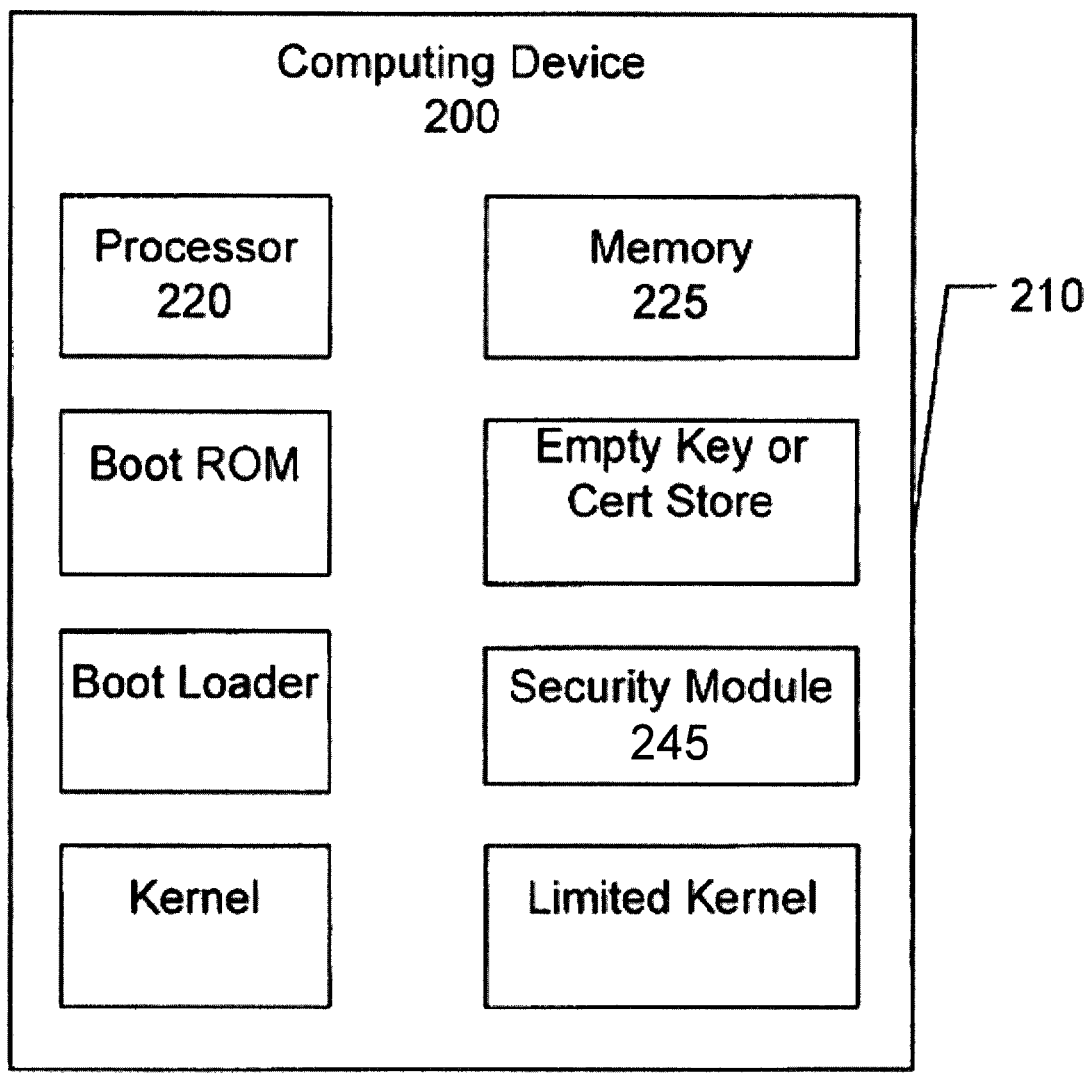
FIG. 5 shows another example of a client in another embodiment of the system.
Figure 6:
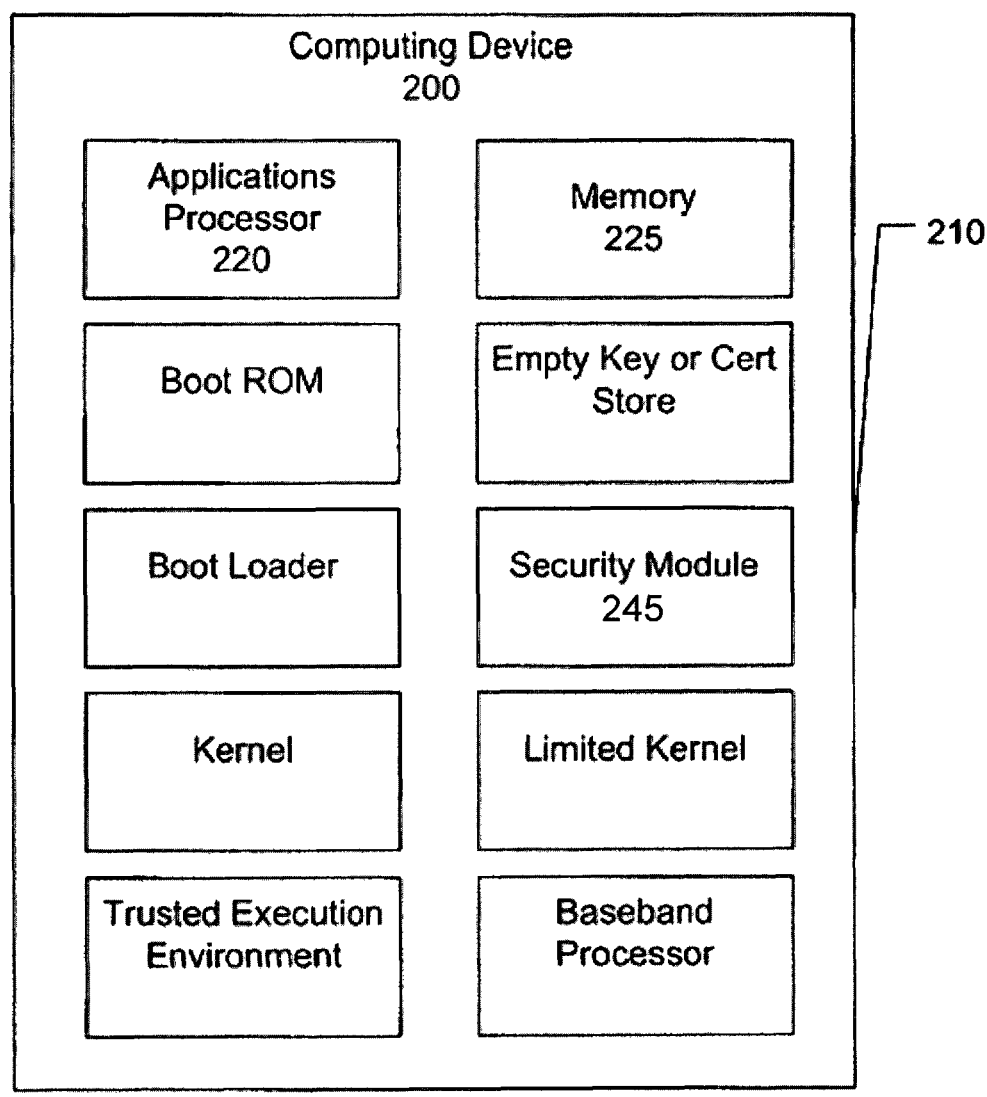
FIG. 6 shows another example of a client in another embodiment of the system.
Figure 7:
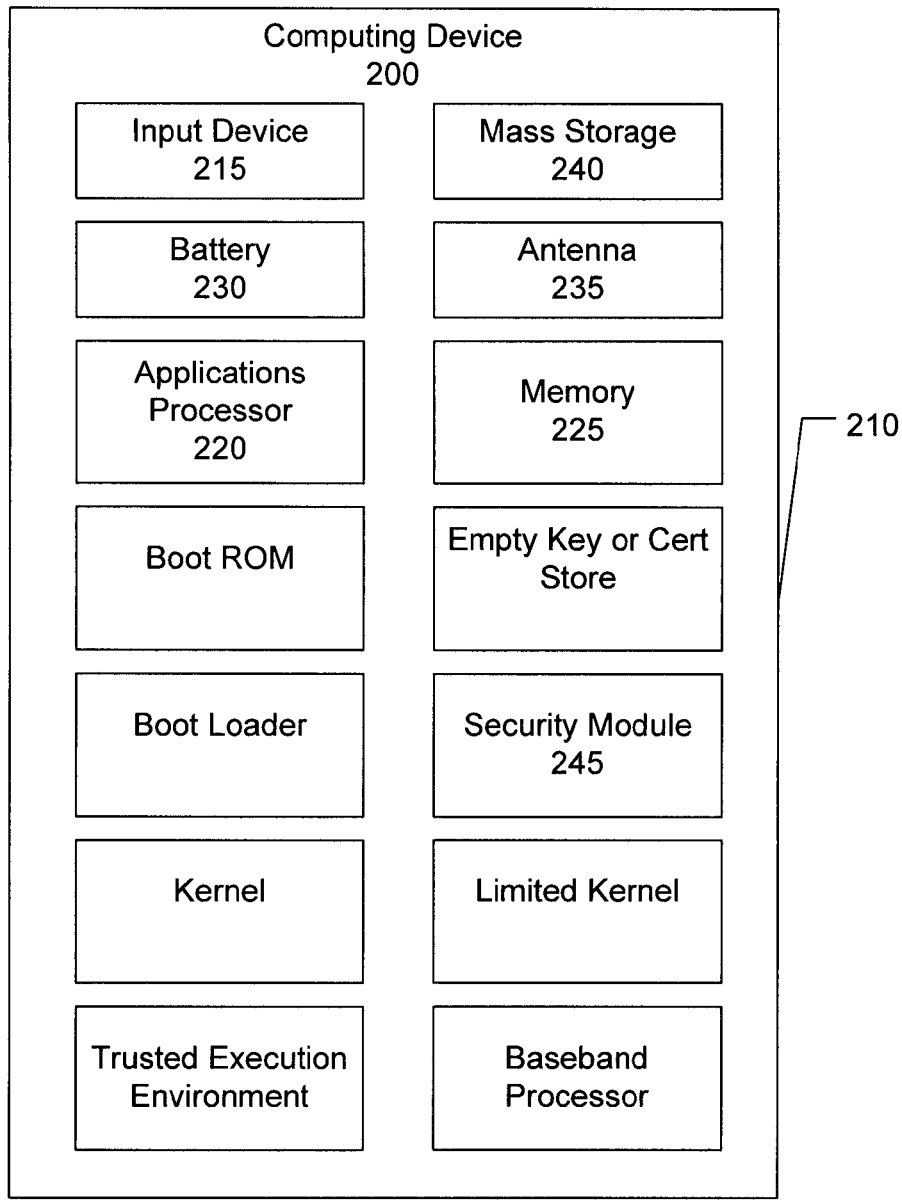
FIG. 7 shows another example of a client in another embodiment of the system.

FIG. 3 shows a simplified block diagram of a system 300 for multiparty authentication and authorization. This system includes a computing device 305 associated with a user A, a first party 310 (or first party 310 system), a second party 315 (or second party 315 system), and a third party 325 (or third party system 325) that are connected through a network 320. The computing device 305 and network 320 may be as shown in FIGS. 1-2 and described above regarding device 105 and network 125. In embodiments, computing device 305, second party 315 system, and third party 325 system may be mobile devices.

In an embodiment, the system requires two parties, such as second party 315 and third party 325, to authorize an attempted access of a device 305 that has been reported lost or stolen to first party 310. In an implementation, there is a cloud controller (or security component), second and third parties, and authorizations that the second and third parties provide via the controller that authorize and allow an attempted access of computing device 305 after computing device 305 has been reported lost or stolen to the controller. Again, it should be appreciated that there could be n+1 parties. In other words, there may be any number of parties that are all required to authorize an attempted access.

In an embodiment, there is a device, a controller or cloud controller, and two authorizers. In an embodiment, the owner (user A) of the device 305 and an authorizer are the same person. In an embodiment, user A may obtain possession of device 305 after having reported device 305 lost or stolen, at which time user A's use of a password with which user A normally accesses device 305 may be an authorization. This embodiment represents a consumer approach.

In another embodiment, an authorizer is a carrier representative. In the embodiment, a service provider or carrier operates the cloud controller. Upon a customer call reporting that device 305 has been lost or stolen, the representative may be able to remotely lock or otherwise disable device 305. Thus, the system is able to institute security features in addition to requiring two-party authorization.

First party 310 may be referred to as a controller, cloud controller, security services provider, or security component, and may use one or more servers. Second party 315 and third party 325 are parties other than or different from the first party 310. The second and third parties 315 and 325 may be, for example, an end user of a computing device, an owner (user A) of the computing device 305 on a different computing device, a mobile network operator (MNO) or carrier, or administrator. In various embodiments, the cloud controller is always one of the parties and the identity of the other parties can vary. For example, the other party may be the user A, a person known to the user A, a carrier, or an administrator.

Depending upon the application of the system, the cloud controller may be operated by an enterprise, a security service provider, e.g., Lookout, or a mobile network operator. The cloud controller may be operated by a manufacturer of the entire computing device or of a component of it. In this embodiment, a manufacturer may provide authentication or authorization. The manufacturer may act as a security service provider. A manufacturer may provision the device with certain components for the multi-party authentication or authorization as part of the manufacturing process. Alternatively, a business that has many of these devices may be an owner of the devices (e.g., enterprise, a device fleet owner, or a mobile network operator type of equivalent).

A feature of the system requires two parties, such as second party 315 and third party 325, to authorize an attempted access of a device 305 that has been reported lost or stolen to first party 310. In an implementation, there is a controller, second and third parties, and authorizations that the second and third parties provide via the controller that authorize and allow an attempted access of computing device 305 after computing device 305 has been reported lost or stolen to the controller. In an implementation, the controller, third party, and authorizations that the second and third party provides via the controller include authentications that are verifiable on the device, that prove the identities of the second and third parties authorizing the action (e.g., kill device). It should be appreciated that there could be n+1 parties. In other words, there may be any number of parties that are all required to authorize an attempted access.

In an embodiment, there is a device, a controller or cloud controller, and two authorizers. In an embodiment, the owner (user A) of the device 305 and an authorizer are the same person. In an embodiment, user A may obtain possession of device 305 after having reported device 305 lost or stolen, at which time user A's use of a password with which user A normally accesses device 305 may be an authorization. This embodiment represents a consumer approach.

In another embodiment, an authorizer is a carrier representative and a service provider or carrier may operate the cloud controller. Upon a customer call reporting that device 305 has been lost or stolen, the representative may be able to remotely lock or otherwise disable device 305 with, e.g., kill switch functionality. Thus, the system is able to institute security features in addition to requiring two-party authorization. Examples of such security features can be found in the following. U.S. Patent Publication No. 2014/0187202, entitled Method And Apparatus For Auxiliary Communications With Mobile Communications Device, expressly incorporated herein by reference, discloses the use of a hidden ROM that configures a security component to work separate and apart from the OS. The security component can take pre-programmed security actions, such as erasing or faking data in the device. Additionally, U.S. Patent Publication No. 2014/0373184, entitled Mobile Device Persistent Security Mechanism, expressly incorporated herein by reference, discloses a security application program that provides features to help users recover their stolen mobile communication devices. For example, a thief upon stealing the mobile communications device from the device owner or authorized user may attempt to wipe the device in order to resell the device. Wipes can happen by the boot loader by pressing several keys or via USB (generally a boot loader does not communicate with the network) and without network coverage. For example, the device may be put in a metal box and a master clear may be performed. A wipe—which may also be referred to as a clear, factory reset, or hard reset—deletes the "/data" partition and thus all the user data, e.g., contacts, messages, user-installed apps, and so forth. The wipe can restore the device to the state of the device when it was first booted (or the state after the last ROM installation or upgrade). Data stored in the "/system" partition, however, is preserved during a wipe. Thus, a user who has had their device stolen and subsequently wiped, can use the security program to help recover their device. The security program may be referred to as a persistent security program because it persists after a wipe or clear operation. And, U.S. patent application Ser. No. 14/297,524, entitled Method And System For Rendering A Stolen Mobile Communications Device Inoperative, expressly incorporated herein by reference, discloses rendering a stolen mobile communications device inoperative, for example, by removal of a cryptographic key at a security component on the mobile communications device.

In another embodiment, a third-party business that has, for example, a private key that the third-party may use to sign a request. This can provide an access code for a device. The third party may have software into which they type the device identifier and the software may then provide the system with an access code that may be verified.

FIGS. 4-7 show examples of various computing devices and some internal components of a system for authorizing or authenticating an action using two or more parties.

Figure 8:
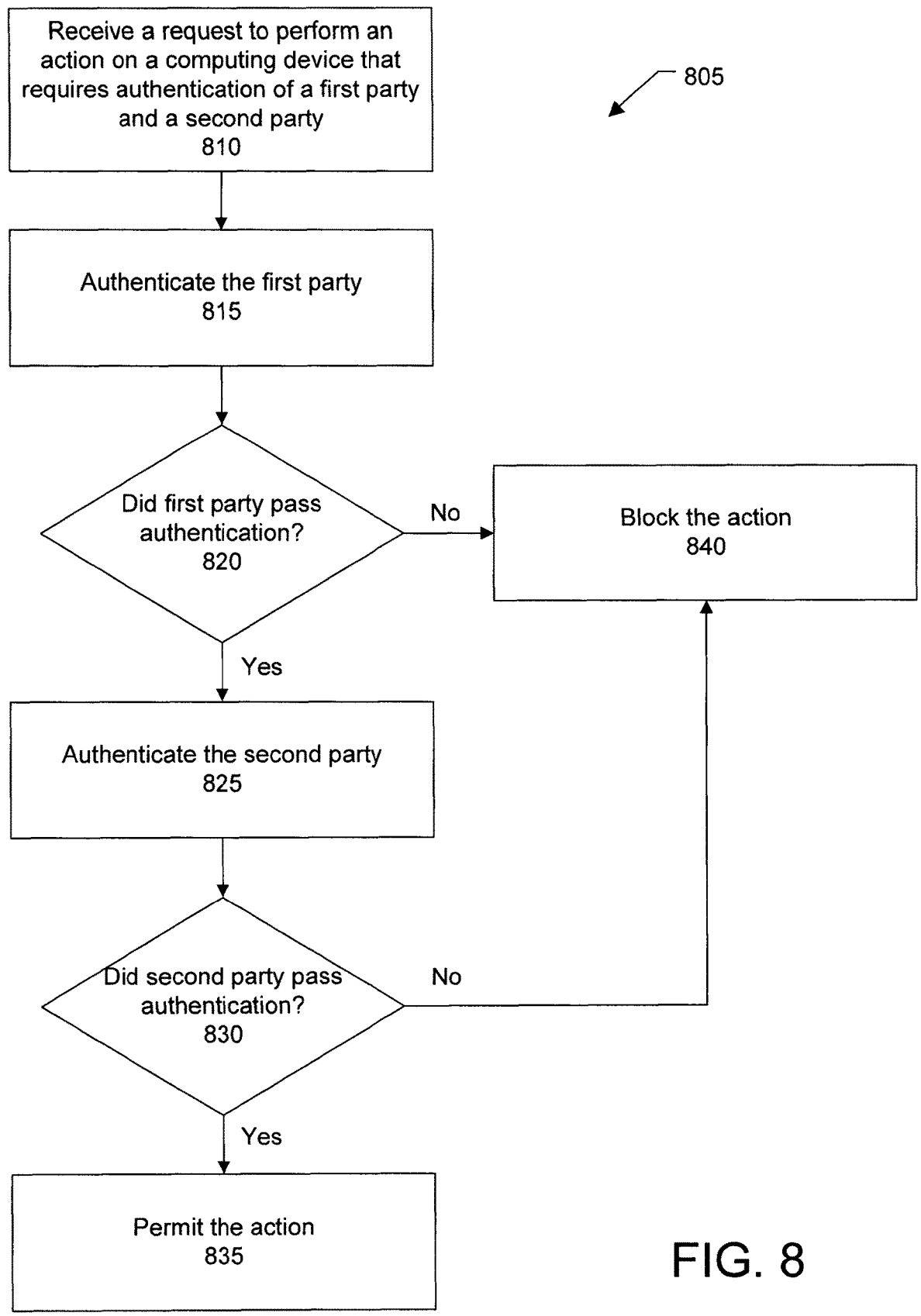
FIG. 8 shows an overall flow diagram for multiparty authentication.

FIG. 8 shows an overall flow 805 of an embodiment of the system for multiparty authentication. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In brief, in a step 810, the system receives a request to perform an action on a computing device that requires authenticating a first designated party (not shown, but, e.g., client system 105 (FIG. 1), second factor client 110 (FIG. 1), security server 120 (FIG. 1), customer care console (FIG. 1), electronic device 200 (FIG. 2), or (computing device 305 (FIG. 3), or first, second, or third parties 310, 325, or 315 (FIG. 3)) and a second designated party (also not shown, but, e.g., any of the examples given for the first designated party). In a step 815, the first designated party is authenticated. In a step 820, a determination is made as to whether the first designated party passed the authentication. If the first designated party passes the authentication, in a step 825, the second designated party is authenticated. In a step 830, a determination is made as to whether the second designated party passed the authentication. If the second designated party passes the authentication, in a step 835, the action is permitted.

Alternatively, if any of the parties fail the authentication process, the action is blocked (step 840). That is, if the first designated party fails authentication, the action is blocked. If the second designated party fails authentication, the action is blocked. In an implementation, the action is permitted only after the first and second designated parties pass authentication. More particularly, if the first designated party passes the authentication process, but the second designated party fails authentication, then the action is blocked. Conversely, if the second designated party passes the authentication process, but the first designated party fails the authentication, then the action is blocked.

It should be appreciated that the process of authenticating the parties can occur in any order. For example, authentication of one party for an action may occur before authentication of another party for the action. Authentication of one party for an action may occur after authentication of another party for the action. Authentication of one party for an action may be concurrent, simultaneous, or overlap with authentication of another party for the action.

In an embodiment, an initial step includes a provisioning of authorization credentials. The provisioning can happen in a variety of different ways. In a first case there is a user and a security program. With a password from the user and authorization pre-emptives, credentials are created and sent to a server, which is in this embodiment the controller server. There are also embodiments in which a manufacturer, MNO, or others, provision a protected secret into the device or device component. And combinations of these elements are possible. In a typical embodiment, the provisioning of the authorization or the authentication scheme happens first. The provisioning provides for a trust anchor. The trust anchor may be the user in possession of the password. Also, the trust anchor may be provisioned at the factory.

During the actual usage or authentication process, a party may contact the controller and provide authorization credentials. Communications may be parallel. Alternatively, communications may be serial. The initiator or first designated party may be the end user that knows their device is missing. The end user may call a carrier call center. There may be multiple modes of operation. In one mode, there is a two-out-of-four operation mode, so there are four possible authorizers and two of the authorizers may be needed to okay or confirm the action. So, for example, the system may require the user and the carrier okay or confirm the action. In addition, one party may initiate the action and another party may confirm the action. In general the system may operate in an M-out-of-N operation mode, in which there are N possible authorizers, and M of the authorizers may be needed to okay or confirm the action. In another embodiment, an M-out-of-N operation mode refers not to the number of possible authorizers, but rather to the sum of their relative weights as authorizers. E.g., in a 3-out-of-7 operation mode, most authorizers may have a predetermined authorization weighting of 1, while a special and particularly trustworthy authorizer TA may have a predetermined authorization weighting of 2. Thus, in this embodiment, the required total weight sum of 3 in the 3-out-of-7 operation mode can be accomplished by one of the normal authorizers having authorized the operation (weighting of 1) and the particularly trustworthy authorizer TA having also authorized the operation (weighting of 2), for a total weight sum of 3, meeting the requirement for the operation mode.

Figure 9:
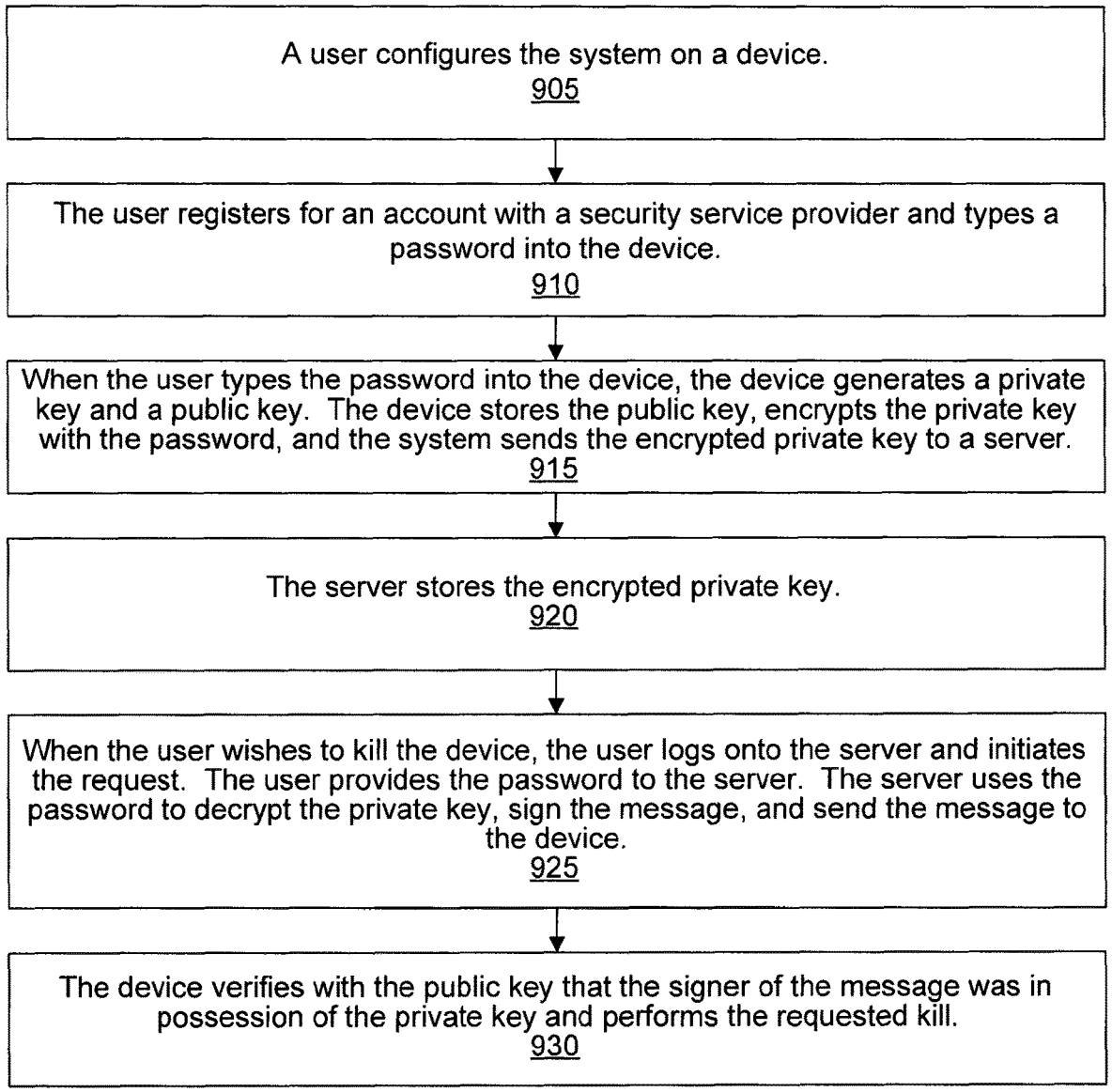
FIG. 9 shows an overall flow diagram for multiparty authentication.

FIG. 9 shows an overall flow diagram for multiparty authentication. In FIG. 9, at step 905, a user configures the system on a device. At step 910, the user registers for an account with a security service provider (e.g., Lookout). When the user registers for the account, the user types a password into the device. At step 915, when the user types the password into the device, a private key and a public key are generated. The user stores the public key on the device, encrypts the private key with a password, and the system sends that encrypted private key to a server. At step 920, the server side stores the encrypted private key. The server, however, is prevented from accessing the private key because the server does not know the password. And the device has a public key, but also, because it does not have the private key, the device cannot unilaterally take action. Thus, the environment is now in steady state. At step 925, when the user wishes to kill the device, the user logs onto the server and initiates that request. When the user logs into the server, the user provides their password to the server. The server uses that password to decrypt the private key, sign the message, and send it to the device. At step 930, the device verifies with the public key in its possession that the signer of the message was in possession of the private key, which could only have happened if the user's password was involved. After this the kill may be performed.

In an alternate embodiment, the server may transmit the encrypted private key to the user's client. Note that in some embodiments, such as this one, the user's client may be or may not be the device. Generally, if the user is not in possession of the device, the user's client will be another computing device. Locally, on the client, the user supplies their password, decrypts the private key, signs the message, and sends the signed message to the server without having given the server access to that password. The client may connect to the server via a Web browser at the client. In this embodiment, the server does not get possession of the user's password. This embodiment may be referred to as a zero-knowledge case.

The zero-knowledge case may, however, be impractical for a number of reasons. In an embodiment, the server receives the user's password, performs the encryption, and then deletes the user's password. This embodiment may be preferable to the zero-knowledge case when the main use case is more concerned with guarding against a one-time server adversary, e.g., a hacker who causes a disruption, than with guarding against a persistent server adversary, e.g., not trusting the server itself.

In another embodiment, the same functionality may be relocated to the client running side of the functionality provided by the Web interface. In the embodiment, the secret does not get transmitted to the server. That is, the server does not get access to the plain text user password, so it never possesses sufficient information to take the action unilaterally.

As discussed, a feature of the system includes the authorization of an action in a cryptographically verifiable way (e.g., using asymmetric or symmetric keys), where there is an additional authorizer or another party in addition to a server. In other words, a feature of the system provides for multiparty authorization. In an embodiment, multiparty authorization is provided for remote actions. For example, if a remote action service provider (e.g., Lookout or Apple) does not wish to perform the action on the device, the provider can simply not transmit the request to the device. The provider may be an explicit or an implicit authorizer.

In an example of an explicit authorization the server signs a command that confirms agreement with the action, and the user signs the command as well to indicate their agreement with the action. There may further be a third party, such as a carrier, that may be required to also indicate agreement. Alternatively, a user may sign a command and the server may choose to route it to the device. In an example of implicit authorization, the server allows the user to send something to a device. By the allowing the server implicitly authorizes the action, since, if the server/provider is not willing to transmit to the device, the user, not having a connection to the device, cannot send to the device.

A feature of the system provides for an additional layer of consent for a particular action (e.g., kill device). In other words, in addition to the server at least one other party is involved. And in one embodiment, that other party is the user. This feature affords the user a level of control such that not even the operator of the system can wipe the device without the user's consent. Thus, even if a remote kill switch service is breached, an intruder will be unable to initiate a remote action (e.g., kill device), because of the requirement for another party to authorize the remote action via, for example, public/private key cryptography.

Consider, as an example, the following scenario. A user wishes to kill their device. A call is placed to the carrier to request authorization to kill this device. The system can include a circuit breaker. The two-party system can operate like a veto button to alleviate concerns about a third party and from a liability standpoint. In an embodiment, an audit trail records information associated with the requested action. The audit trail can record a time and date of the request, the origin or geographical location of the request, identities of the parties involved in the request, whether or not the request was granted or denied, and so forth. The audit trail may be reviewed to detect anomalies. In an embodiment, if the frequency of requests exceeds a threshold (e.g., ten requests per second), the system may begin to deny or delay the response in order to seek human intervention or confirmation.

In an embodiment, a circuit breaker helps to address improper attempts by, for example, terrorists to kill multiple devices. After, for example, a certain rate or number of kill actions, the circuit breaker trips. In another embodiment, any one of the parties can trip the circuit breaker—both the carrier and the user may do it. In this embodiment, it is not a particular advantage as to one of them. And the policy may be controlled on the device so the device would receive one or more authorized commands, signatures, or proof of authorizations. The device may be required to decide which mode it wants to operate in. The device may be pre-configured, for example. That is, the device may be pre-configured with a policy that does not allow a single party (e.g., MNO or the manufacturer) to perform certain actions (e.g., kill device) without obtaining confirmation from another party.

The policy may be a complex policy that specifies the parties required to approve the action. For example, depending upon the policy logic, the carrier and the device manufacturer may be insufficient. A particular policy may require the user and either the carrier or the device manufacturer.

Figure 10:
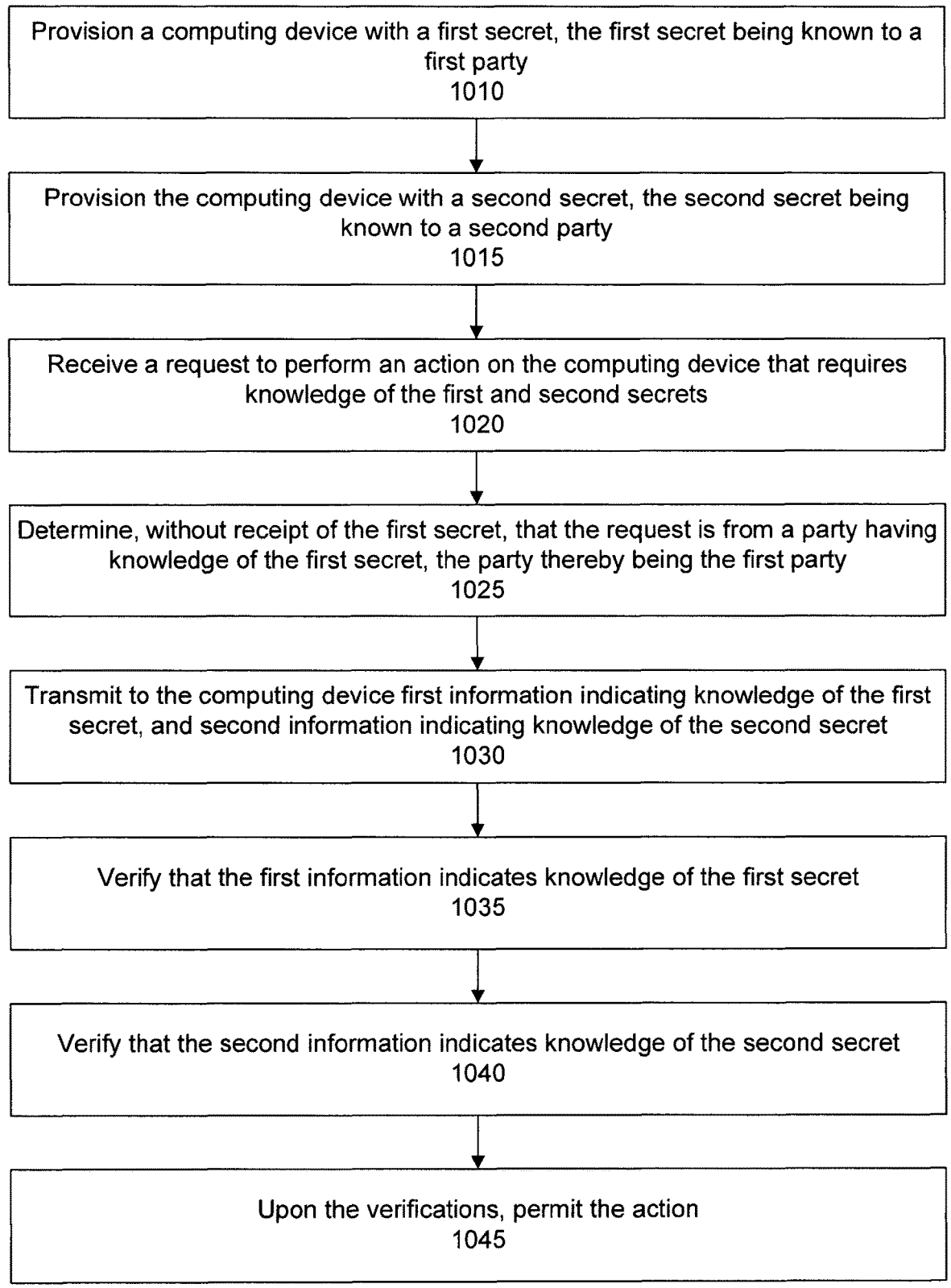
FIG. 10 shows a more detailed flow diagram of an embodiment for multiparty authentication.

FIG. 10 shows a more detailed flow 1005 of an embodiment of the system for two-party authentication or authorization. In a step 1010, a computing device is provisioned with a first secret that is known to a first designated party. In a step 1015, the computing device is provisioned with a second secret that is known to a second designated party. In an implementation, the second designated party does not know the first secret. The first designated party does not know the second secret. In a step 1020, a request is received to perform an action on the computing device that requires knowledge of the first and second secrets. In some embodiments, the request is received at a server, perhaps one operated by a carrier or a manufacturer, or accessed through a call center. In other embodiments, the request may be received at the device (e.g., because the user found their device) and the device or device security component transmits the need for authorization to the server. That is, the device does not send on the request for the action, only the request to authorize the action.

In an embodiment, a device configuration flow or provisioning flow includes a public key that an authorizer burns into the device at the factory, say from the manufacturer or the carrier. In another embodiment, a user may enter a password on the device that is responsible for creating keying material. That password may be entered either through the host OS in an application, or it may be entered through a UI created from a secure environment. A secure environment allows for taking over the screen and having a particular input method. The input method can bypass the host OS, so that the keying material may be provided directly to that trusted UI.

In a step 1025, a determination is made, without receipt of the first secret, that the request is from a party having knowledge of the first secret. The party thereby being the first designated party.

In a step 1030, first information is transmitted to the computing device indicating knowledge of the first secret, and second information indicating knowledge of the second secret.

In a step 1035, the first information is verified to indicate knowledge of the first secret. In a step 1040, the second information is verified to indicate knowledge of the second secret. In a step 1045, upon the verifications, the action is permitted.

The action may be any type of action in which it would be desirable to have at least one other party authenticate, verify, or confirm the action. In an embodiment, the action is of a type that disables the device. In this embodiment, the action may be referred to as a kill switch. There is some resistance on the part of carriers/operators to implementing a kill switch type of operation for lost or stolen phones, perhaps due to a feeling on their part of liability for incorrect invocation of such a capability. This disclosure describes mechanisms for implementing a kill switch operation requiring the actions of at least two parties (not just the carrier/operator).

A kill switch may be a logical or physical switch on a device which, once thrown/triggered, disables the normal operation of the device. The device may be completely disabled, or may have a special operation mode which can allow subsequent communication to the device to re-enable the device's normal operation (undoing the throwing of the kill switch) and/or to support communication to the device to facilitate recovery of the lost or stolen device (e.g., providing messages or instructions to the finder of the device regarding how/where to return the device to an authorized recovery agent, for example, a retail store of a mobile network operator).

The kill switch may be placed in a software component of the device, a hardware component of the device, or both. For example, there may be software in the host OS that can trigger hardware functionality. One example includes a fuse embedded in the main processor that is flipped or blown, such that the computing device (e.g., smartphone) is not operable anymore. And because the fuse is contained in the chip, it is not something that may be replaced without advanced soldering skills and detailed knowledge of the chip.

Another example includes a secure boot environment such as an ARM TrustZone®. In the example, a secure boot environment prevents the host OS from running, and also possibly the ARM or any operating system running on that chip, if it is a multiple OS system, such as an ARM OS and a host OS. The cryptography may be done on the host OS or may be done in a secure boot environment. There are some advantages to doing all the cryptography in the secure boot environment because keys may be stored securely so that the host OS cannot access them. There a number of ways to provide for a trusted layer in TrustZone or any type of secure boot environment on a device. It may be desirable for all of the cryptographic operations to occur in the secure environment so that, even if the host OS is one hundred percent compromised, the cryptography is rooted—there is no way that the kill may be triggered by the local OS or that any information that could be used to trigger the kill is available to the host OS.

A device may have a secure environment, such as a TrustZone. An action (e.g., a kill switch action) may also happen in a secondary OS that is different from the host OS such as, for example, a radio-baseband OS. A smartphone may be running Android, which is the host OS. And there may be a Qualcomm radio that is part of the smartphone, which can have a secondary OS that is running on the radio's baseband processor. The functionality or action may be triggered through that radio OS which is considered hardened, relatively speaking, and the kill might be considered to happen or originate from there.

A device may be physically disabled using thermite, an explosive charge, or a nonchemical destructive charge. There may be a physical disablement of the device using thermite that is remotely triggered.

The kill could be partial. So, for example, a partial kill may include only disabling the host OS but not the radio OS. That is, the radio OS still functions so that it could still register with the network and the device could still be communicated with through the radio OS. Without the host OS, however, the device may be unusable to an end user. In other words, there may be a kill for a component of the phone and not necessarily the whole phone.

In an embodiment, there may be a kill switch only in or for the baseband processor that only kills the baseband processor function and not for the device as a whole. This nonetheless provides a certain degree of protection and prevents any network communication. A partial kill may be extended to any other kind of component, including the sensors, the cameras, the audio subsystems, or combinations of these. Many components have their own software or firmware running in each of those chips as well, and each of those could have a kill-switch functionality in them as well.

As discussed above, in other embodiments multi-party authorization may be required to trigger an action other than a kill switch. For example, the action may be to wipe data from a device, lock device, change password on a device, decrypt/encrypt data on a device, or perform any other administrative function on a mobile device. Such authorization may be performed to trigger any form of action on a device where it is important that the action not be performed inadvertently.

In an embodiment, instead of killing the device, a component, either on the host OS in the boot loader or in a secure environment, takes over the screen and prevents other functionality from happening. This is particularly useful in cases where it may be desirable to un-disable the device. That is, in a disabled device there may still be a user interface component available for the user of the device to undo the disablement by interacting with the device. Thus, the act of disablement may involve disablement of some but not necessarily all parts or capabilities of the device. The ability to perform communication from the device to support a flow for re-enabling the device may still be active. At the same time, the ability to perform communication may not support any sort of general purpose communication. A display on the screen may indicate that the device has been disabled. A secure boot environment, e.g., a TrustZone, may do this as part of the boot process, by booting directly into the screen that prevents other functionality from happening—a lock screen or "super lock screen."

It may be desirable for all USB firmware updates to be disabled, and this may include disablement of all forms of updating the device, both via USB as well as potentially JTAG or other forms of on-chip debugging or in-circuit debugging. Such a feature may be advantageous in the cat-and-mouse game between security experts and malicious hackers. For example, as soon as a certain security measure is implemented, attempts will be made to design or otherwise get around it. These might include developing chips that attach to the bus (e.g., soldering chips). Such components may disable the efficacy of buses or alter the bus input. But, if the security is all on-chip, e.g., the memory to run the security routine is on-chip—that is, on the main IC that runs the CPU, then there is no bus input to change the functionality of the security routine. Thus, no memory bus issue exists when retrieving the security routine from the trusted layer and the memory. Still, it may be possible to find the area where the security routine or enabling security keys may be stored in the flash memory. If the security routine is all stored on-chip, defeating the security may require decapping a chip, e.g., poking at it with X-rays or electronic microscope. Such equipment is very expensive.

Figure 11:
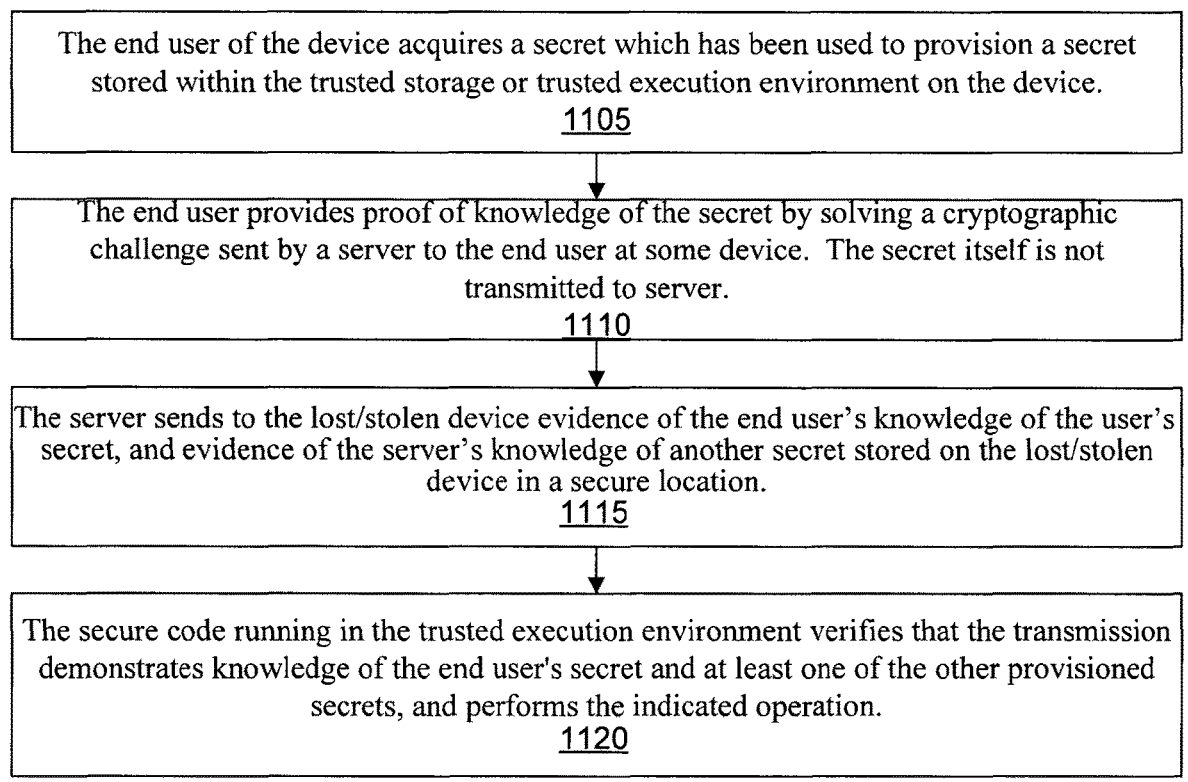
FIG. 11 shows an overall flow diagram for multiparty authentication.

FIG. 11 shows an overall flow diagram for multiparty authentication. In this embodiment, at least two parties, one of whom is the end user of the device, are required to act to trigger the device kill switch. The activation of the kill switch is performed by code that runs as part of a secure boot sequence or runs in a trusted execution environment, such as the ARM Trust Zone. In FIG. 11, at step 1105, the end user of the device must possess a secret which has been used to provision a secret stored within the trusted storage or trusted execution environment on the device. At step 1110, the end user provides proof of knowledge of the secret by solving a cryptographic challenge sent by a server to the end user at some device. The secret itself is not transmitted to server. At step 1115, the server sends to the lost/stolen device evidence of the end user's knowledge of the user's secret, and evidence of the server's knowledge of another secret (e.g., one provisioned by the MNO, device manufacturer, or security software provider) stored on the lost/stolen device in a secure location. Several such secrets may be provisioned on the device (e.g., for different MNOs or the device manufacturer). The secure code on the lost/stolen device requires proof of the knowledge of the end user's secret and at least one of the other provisioned secrets in order to throw (or undo) the kill switch. At step 1120, the secure code running in the trusted execution environment verifies that the transmission demonstrates knowledge of the end user's secret and at least one of the other provisioned secrets, and depending on the command (to throw the kill switch or to undo the kill switch) performs the indicated operation.

The operation of demonstrating proof of knowledge of a secret may be accomplished by cryptographic means, without requiring the transmission of said secret across a network. Such protocols are referred to as zero-knowledge proofs. The operation is not susceptible to replay.

The server (or second designated party system) that communicates with the lost/stolen device may be operated by the MNO or operated by a third-party service provider, which communicates with the lost/stolen device, and with an organization that can provide knowledge of one of the other provisioned secrets on the device.

The end user secret may be: a private key with a corresponding public key; a password, which serves to authenticate the user, and which may be used to generate a private/public key pair; a biometric measure, which serves to authenticate the user, and which may be used to generate a private/public key pair; a token or physical device, the possession of which serves to authenticate the user, and which may be used to generate a private/public key pair; or a combination of a password or a biometric measure or a token, the combination which serves to authenticate the user, and which may be used to generate a private/public key pair.

Storing a result of the end user secret on the device can occur when the device is in the end user's possession (before it has been lost or stolen). The end result may be the public key of the generated private/public key pair. In an implementation, the result of the end user secret is stored in a trusted storage location or in a trusted execution environment. Once such an end user secret result has been stored, a new or replacement one cannot be stored or overwrite an existing one without demonstration of the knowledge of the original end user secret.

Provisioning a third party secret (such as that of an MNO, device manufacturer, or security software provider) can occur at time of manufacture, or distribution, at time of sale or device activation by an MNO, or at installation or activation time of security software.

In an embodiment, a security program can act as a proxy for the end user in provisioning the device with a result of the end user secret. For example, the end user may have an account with the provider of the security program, and the security program may generate the result of the end user secret, e.g., by using, at the device or at the server, an end user authentication means such as a password to generate a public/private key pair and storing a result on the device.

In another embodiment, a third party identity provider may have a result of a secret provisioned to the device. The third party identity provider may, upon the end user presenting proof of identity and proof of ownership of the lost/stolen device in question, play the role of the end user in providing knowledge of a secret on the device, i.e., in this embodiment, the third party identity provider and the MNO together provide the authorizations that enable the throwing of the kill switch. The proofs presented to the third party identity provider may be conventional non-cryptographic proofs, such as a valid photo ID, and a copy of a bill of sale for the device in question. In an embodiment, the third party identity provider may have pre-arranged a key escrow arrangement with the end user.

The mechanism that verifies multi-party authorization may be implemented in a number of ways. For example, in an embodiment, the system is implemented in a secure boot environment without network connectivity. This embodiment can include receiving a command from an application operating system. In this embodiment, an operating system may communicate with the secure boot environment to trigger the environment to enter a kill switch mode. This may take the form of a secure CPU instruction that allows communication with the bootloader, or may utilize a facility such as ARM TrustZone, or may be a hardware device or memory region that is utilized by the secure boot environment to communicate with an application OS.

It is desirable to have multi-party authorization in this case because it is undesirable for an application operating system to be able to disable a device without external authorization to do so. But, because boot environments do not often have network connectivity, the application OS may be needed to transport a request from the internet to the boot environment.

To confirm that the authorization on device is complete, the secure bootloader may provide a cryptographically signed response that the application OS can use to transmit to a server to confirm completion of the action. Once the secure boot environment has authorized the kill switch action, it terminates the application operating system and refuses to boot into it.

In another embodiment, the system is implemented in a baseband processor. This embodiment can include receiving a command from an application operating system. This embodiment is similar to the secure boot embodiment, where an application OS provides information to baseband.

The communication to the baseband may be in the form of "AT" commands, over a hardware interface (e.g. UART), over a shared memory region, or any other competent mechanism for a baseband OS and application OS to communicate. In the embodiment, the baseband may communicate with a secure boot environment to disable a device, or may have the ability to directly influence the functioning of the device hardware (e.g. disable screen, touch input, and stop normal boot process of application OS, but still allow boot of baseband processor).

In another embodiment, the system is implemented in a baseband processor. This embodiment can include receiving command directly from a wireless network. In this embodiment, a baseband processor receives authorization information from a wireless network, e.g. in the form of an SMS message, or a data connection (e.g. TCP or UDP data).

The baseband processor may perform any of the aforementioned techniques to disable the device. If the device disablement allows the baseband OS to function normally, but disables the application OS, then the baseband processor may receive an "un-kill" command using the same, or different, mechanism as the kill command.

In another embodiment, the system provides for authorizing a command post-kill. For example, after a kill switch, lock, or other command has been executed that disables a device functionality, it may be desirable to have a mechanism to reverse the process. In this embodiment, a method may include, in a secure UI, receiving a code from user input. The authorization from one or more parties may also be input as a code using a user interface on the device. For example, the device may display an identifier on its screen where a user can input that identifier into a user interface of an un-kill authorization system.

In an embodiment, the unlock or un-kill authorization system can store identifiers of killed devices so as to allow the user to provide an end-user secret to produce an "un-kill code." The unlock authorization system may provide a challenge to the user. In response, the user provides a secret. An un-kill code is then generated (either on the user's client or on server) and displayed to user. The user then enters the un-kill code on the device. The device (e.g. secure bootloader, baseband operating system) authorizes or otherwise confirms the un-kill code, and if it is authorized, re-activates device functionality. In an embodiment, entering an incorrect un-kill code more than a specific number of times will make the device unrecoverable. And making the device unrecoverable may include removing the ability to enter further un-kill codes, or triggering hardware functionality that permanently disables all device activity.

In an embodiment, an un-kill code is generated using a secret stored on a server (e.g. MNO secret, security provider secret). In another embodiment, an un-kill code is generated using multiple secret secrets (e.g. user secret+server secret, user secret+MNO secret, MNO+user secret).

Figure 12:
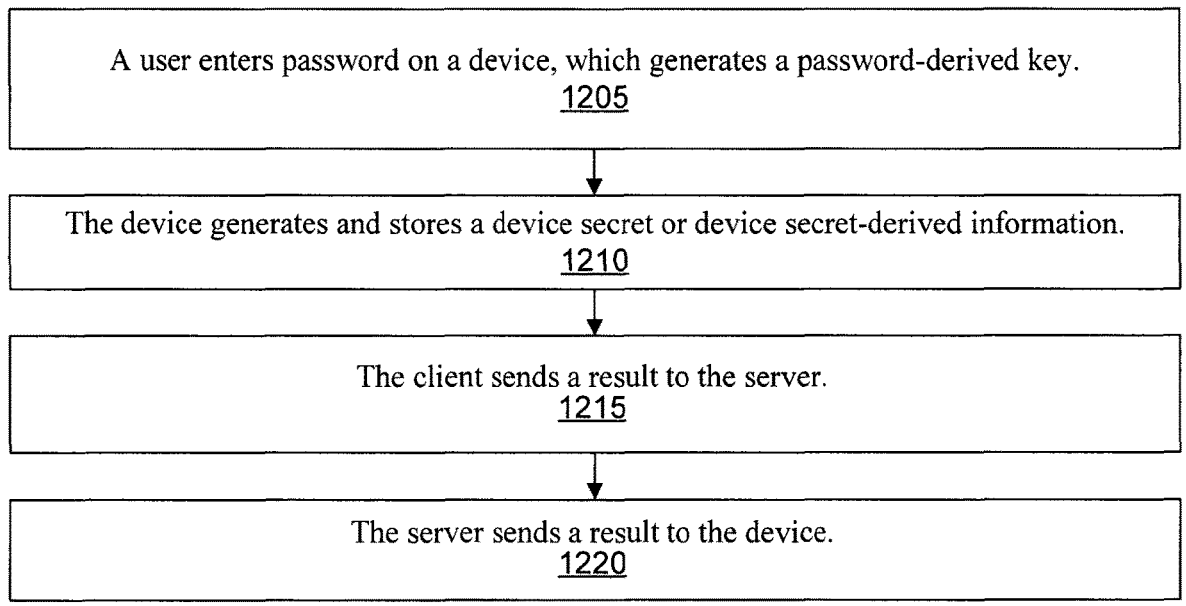
FIG. 12 shows an overall flow diagram for multiparty authentication using cryptography.

FIG. 12 shows an overall flow diagram for multiparty authentication using cryptography. In FIG. 12, at step 1205, a user enters password on a device, which generates a password-derived key (e.g. using PBKDF2, SHA-1 to hash the password creating a key, bcrypt or scrypt to generate a key). At step 1210, the device generates and stores a device secret or device secret-derived information. In embodiments, this includes: the device creates secure material to send to server; the device sends keying material to server; the server generates and sends a nonce to the client; the user enters password on the client; or a cryptographic operation is performed on the nonce using a key derived from the user's password. At step 1215, the client sends a result to the server. At step 1220, the server sends a result to the device.

Figure 13:
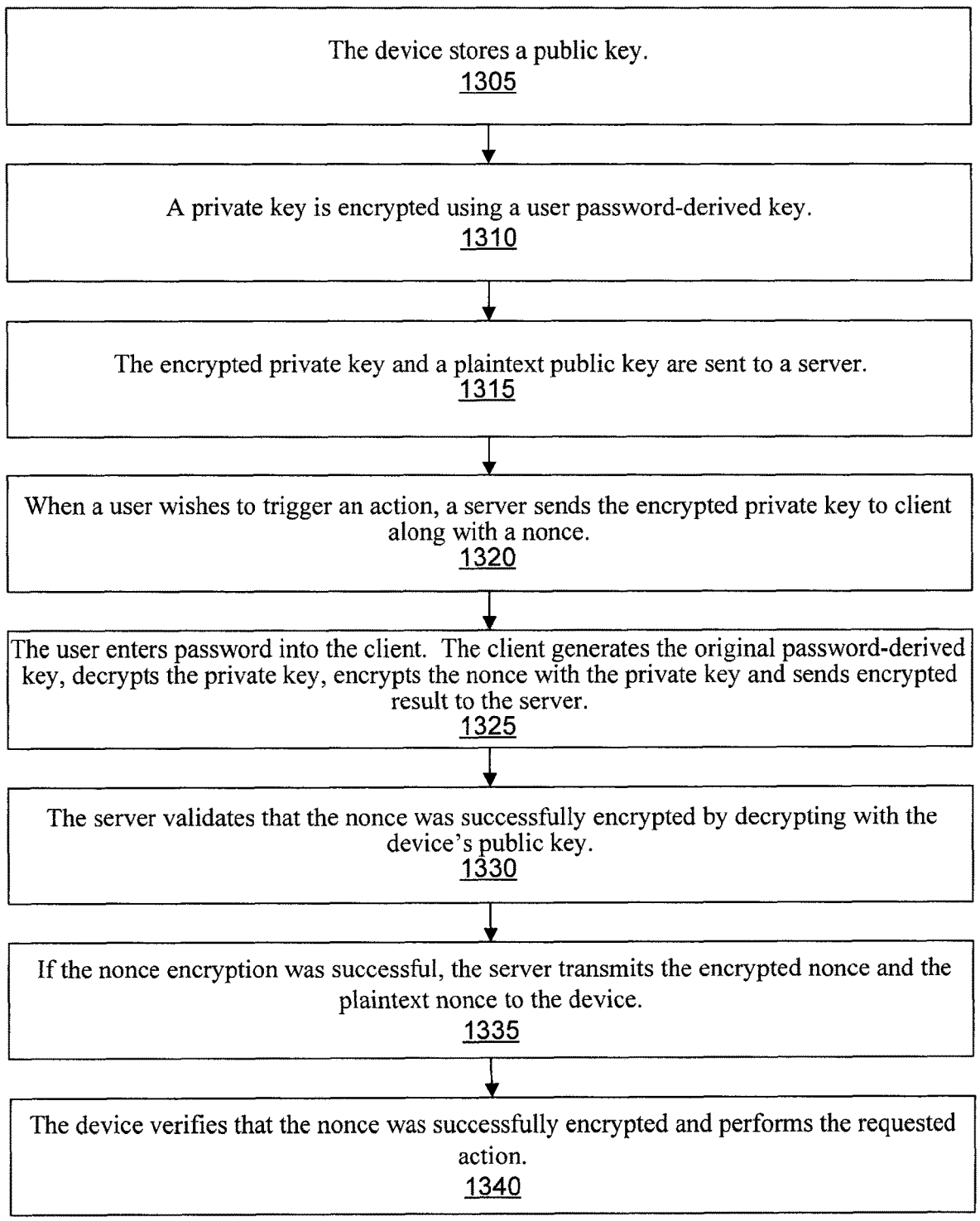
FIG. 13 shows an overall flow diagram for multiparty authentication using cryptography.

FIG. 13 shows an overall flow diagram for multiparty authentication using cryptography. In this embodiment, the device generates a random asymmetric public/private key-pair (e.g. using RSA, DSA, or ECC encryption). In FIG. 13, at step 1305, the device stores a public key. At step 1310, a private key is encrypted using a user password-derived key. At step 1315, the encrypted private key and a plaintext public key are sent to a server. At step 1320, when a user wishes to trigger an action, a server sends the encrypted private key to client along with a nonce. At step 1325, the user enters password into the client. The client generates the original password-derived key, decrypts the private key, encrypts the nonce (or a digest of the nonce in the case of a digital signature algorithm) with the private key (e.g. this can take the form of a digital signature, such as a PKCS7 signature) and sends encrypted result to the server. At step 1330, the server validates that the nonce was successfully encrypted by decrypting with the device's public key. At step 1335, if the nonce encryption was successful, the server transmits the encrypted nonce and the plaintext nonce to the device. At step 1340, the device verifies that the nonce was successfully encrypted and performs the requested action.

Figure 14:
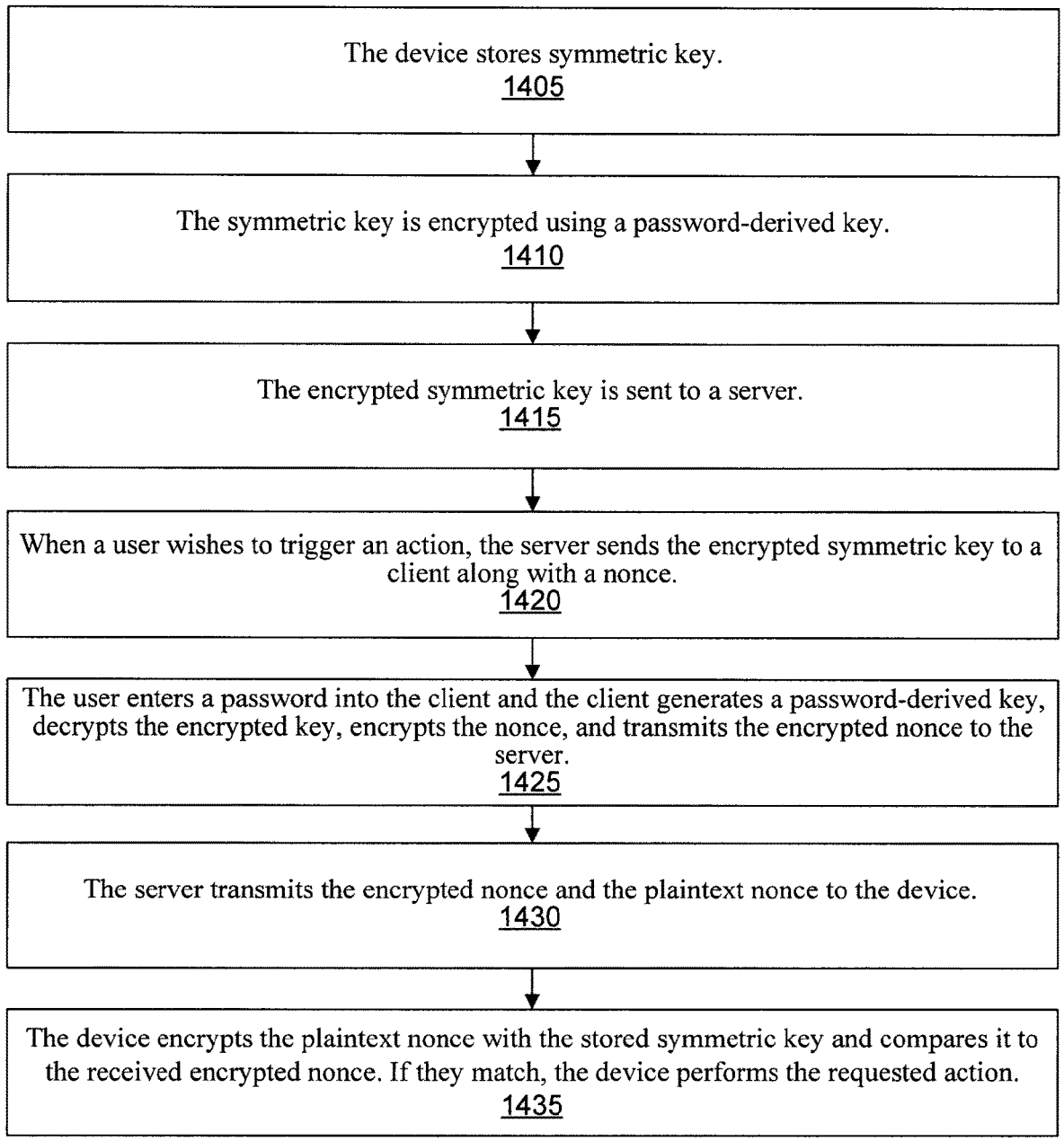
FIG. 14 shows an overall flow diagram for multiparty authentication using cryptography.

FIG. 14 shows an overall flow diagram for multiparty authentication using cryptography. In this embodiment, the device generates a randomly generated symmetric key (e.g. AES-128, AES-256). In FIG. 14, at step 1405, the device stores symmetric key. At step 1410, the symmetric key is encrypted using a password-derived key. At step 1415, the encrypted symmetric key is sent to a server. At step 1420, when a user wishes to trigger an action, the server sends the encrypted symmetric key to a client along with a nonce. At step 1425, the user enters a password into the client and the client generates a password-derived key, decrypts the encrypted key, encrypts the nonce, and transmits the encrypted nonce to the server. At step 1430, the server transmits the encrypted nonce and the plaintext nonce to the device. At step 1435, the device encrypts the plaintext nonce with the stored symmetric key and compares it to the received encrypted nonce. If they match, the device performs the requested action.

Figure 15:
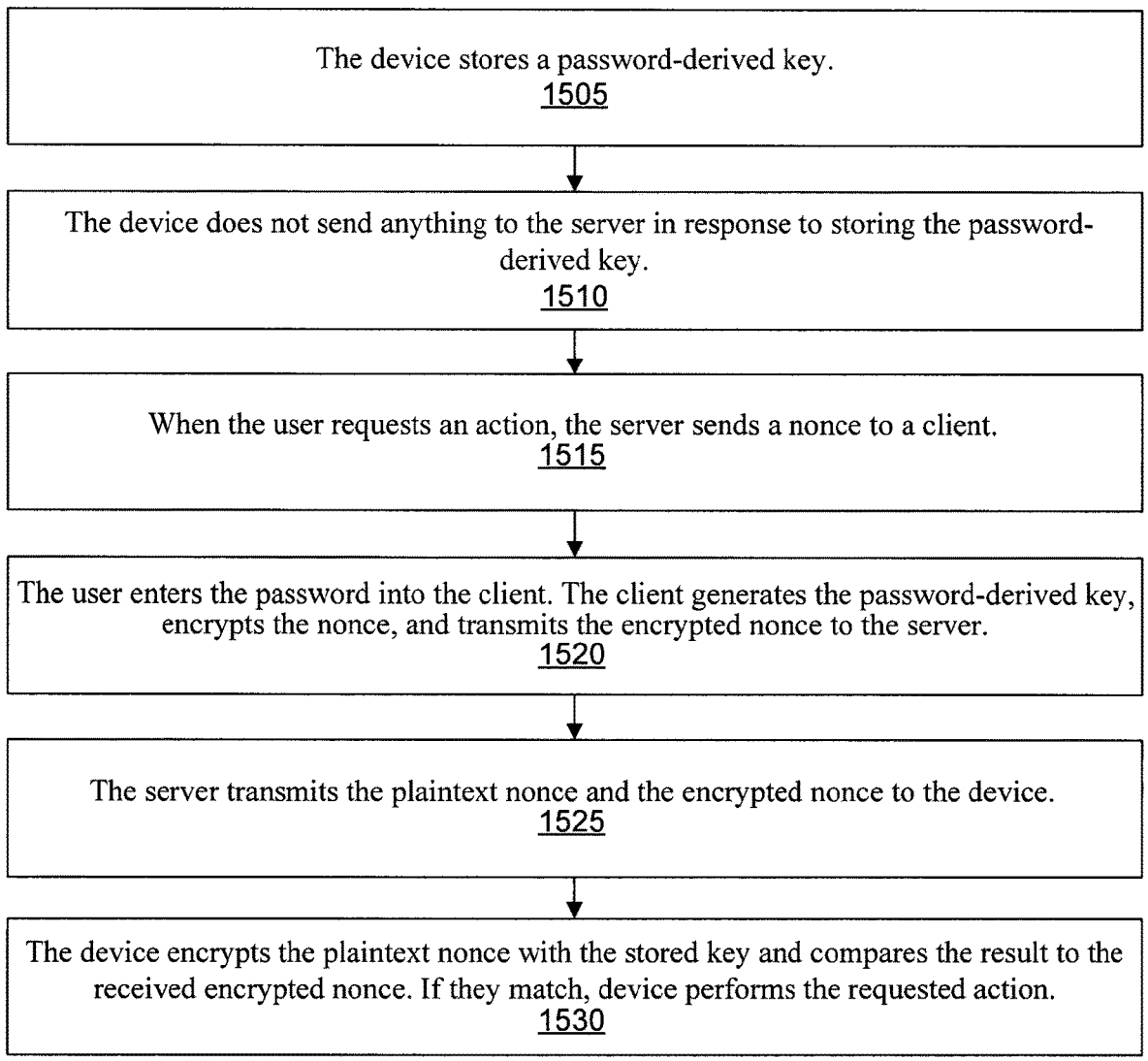
FIG. 15 shows an overall flow diagram for multiparty authentication using cryptography.

FIG. 15 shows an overall flow diagram for multiparty authentication using cryptography. In this embodiment, a device secret is the password-derived key. In FIG. 15, at step 1505, the device stores a password-derived key. At step 1510, the device does not send anything to the server in response to storing the password-derived key. At step 1515, when the user wishes to trigger an action, e.g., the user requests an action, the server sends a nonce to a client. At step 1520, the user enters the password into the client. The client generates the password-derived key, encrypts the nonce that had been received from the server, and transmits the encrypted nonce to the server. At step 1525, the server transmits the plaintext nonce and the encrypted nonce to the device. At step 1530, the device encrypts the plaintext nonce with the stored key and compares the result to the received encrypted nonce. If they match, device performs the requested action.

In another embodiment, instead of a server supplying a nonce, a device may supply the nonce directly to a client, or to a client via server, so that the same nonce may not be replayed against a given device more than once.

In another embodiment, the device records used nonces so that a given nonce cannot be re-used.

In another embodiment, the nonce is augmented (or replaced) with a representation of the action to be performed (e.g. command ID and any command parameters) so that a given authorization code cannot be used to perform a different command than was intended.

In another embodiment, instead of a client performing cryptographic operations with a password-derived key, a client transmits the password to a server where the server performs the operations.

As discussed, a feature of the system includes multi-party authorization. Multiple authorizing parties may be combined for a multi-party authorization system. For example, in an embodiment, the device-storing public key method of user authorization described above, and the public key authorization method described below, are both required to perform an action (such as killing a device).

In another embodiment, the device stores a public key of an authorized party. In this embodiment, when an action is wished to be performed, a nonce and an encrypted version of the nonce (e.g. a digital signature) using the respective private key are sent to the device. The device validates that the nonce is correctly signed to authorize the action. In another embodiment, the device stores an identifier that can be used to obtain the public key of an authorized party over the network, e.g., the identifier may be a domain name for a server from which the public key can be obtained.

Any number of methods of transporting authorization information to the device may be used, e.g., a network. In this embodiment, a device receives data from a server over a network connection (e.g. LTE, GSM, Wi-Fi, Bluetooth). The device may: periodically poll a server, maintain a persistent connection, or receive the data via a push mechanism (e.g., Google Cloud Messaging, Apple Push Notifications, Lookout Cloudpush).

Another method of transporting authorization information includes SMS. In this embodiment, the device receives data from a server via a messaging protocol, e.g. SMS.

In another embodiment, a method may include a manually entered code. Such an approach may be particularly appropriate in the case of a "killed" device that a user wishes to "un-kill" after having recovered a lost or missing device. The killed device may have no network connection so a manual method of un-killing the device is desirable. In this embodiment, a device 305 displays an identifier that a user types into a server to identify the device. The server looks up the device based on its identifier, generates a nonce and sends it to a client. The user enters their password into the client, and the client uses a password derived key to perform a cryptographic operation (e.g. as discussed above). Instead of the client sending the result to the server, the client displays the result (which includes the nonce) for entry into the device to initiate the un-kill.

For example, for the nonce 0xdead0122 (32 bits), and command information being 0x0001 (16 bits), and the result of encrypting the nonce concatenated with the command information with a password derived key being 0xabba01fe02fadadaabba01fe02fadada (128 bits), the client may display "DEAD-0122-0001-ABBA-01FE-02FA-DADA-ABBA-01FE-02FA-DADA" (176 bits), where the device is pre-configured to parse the first 8 hex characters as a hex-encoded 32-bit nonce, the next 4 hex characters as hex-encoded 16-bit command information, and the rest as a hex-encoded 128-bit encrypted version of the nonce (concatenated with the 16-bit command information) where the encryption utilizes AES-128.

In an embodiment, the device 305 displays a nonce that a user enters into a client instead of the nonce being supplied by a server. In another embodiment, the device only requires a truncated version of the cryptographic result. For example, using the example above, the client displays (and the device requires) only the 32 bits of the nonce, the 16 bits of the command information, and the first 32 bits of the cryptographic result, resulting in the code: DEAD-0122-0001-ABBA-01FE, which is much easier to type.

In an embodiment the un-kill operation for a device that has no network connectivity is performed in two stages. In the first stage the user enters a password or performs the type of operation described above, and if the password matches or the operation succeeds, then networking capability is un-killed and restored on the device. Optionally, the restoral of network functionality can be limited to allow a network connection only to a specific server. The second stage proceeds according to one of the previously discussed methods which employ network connectivity from the device.

Figure 16:
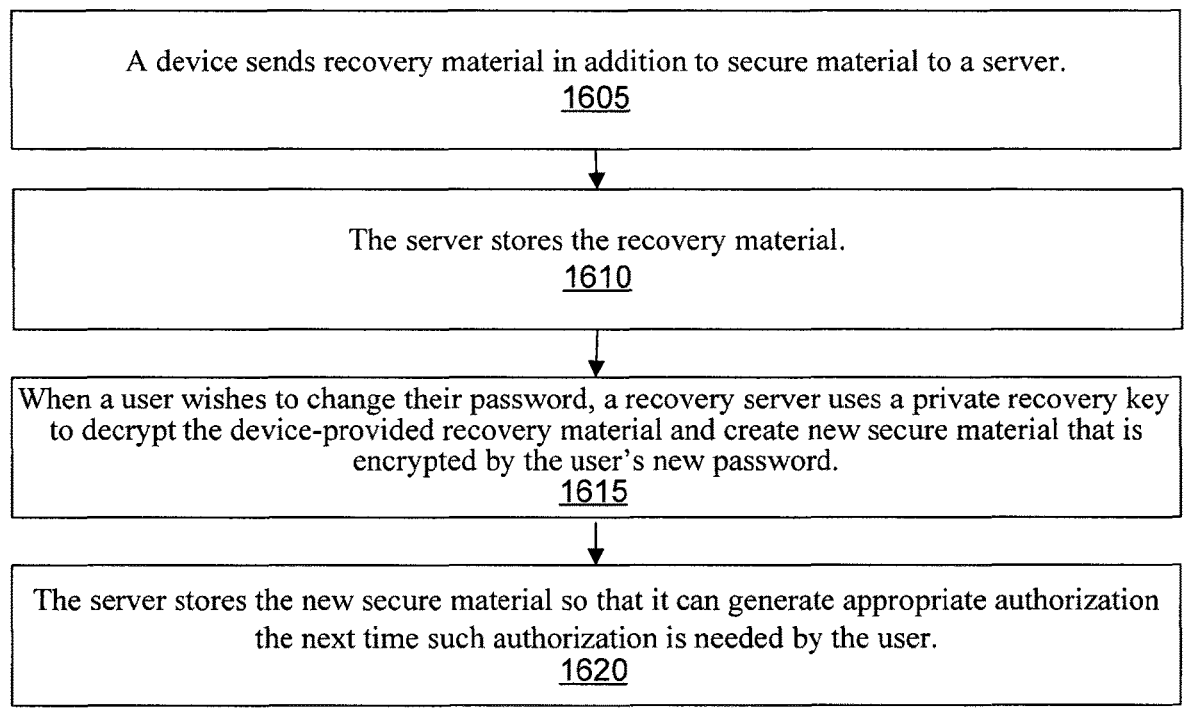
FIG. 16 shows an overall flow diagram for resetting passwords using multiparty authentication.

FIG. 16 shows an overall flow diagram for resetting passwords using multiparty authentication. In this embodiment, in addition to a password derived key, a device encrypts any information that is to be decrypted by a password-derived key (e.g. private key, generated symmetric key) using a public recovery key, so that only the corresponding private recovery key may rescue it. In FIG. 16, at step 1605, a device sends recovery material in addition to secure material to a server. At step 1610, the server stores the recovery material. At step 1615, when a user wishes to change their password, a recovery server uses a private recovery key to decrypt the device-provided recovery material and create new secure material that is encrypted by the user's new password. This re-encryption may take place on the client or the recovery server (where the user transmits password to server). At step 1620, the server stores the new secure material so that it can generate appropriate authorization the next time such authorization is needed by the user.

In an embodiment, a recovery private key is stored in a hardware security module. In another embodiment, recovery private key usage is correlated with password reset requests (e.g. as measured at a load balancer or application server) to identify a situation in which the recovery system has been compromised.

In an embodiment, a policy may have been provisioned to the device that will automatically trigger the kill switch under certain conditions. For example, no "check in" by the device for an arbitrarily configurable amount of time may trigger a kill switch action. The required check-in may be with a designated server at the MNO or a third party. In another example, a kill switch may be automatically triggered if the device "wakes up" in a particular geographic location. Such locations may be grouped, e.g., into a white list of OK geographical locations, and a black list of forbidden geographical regions. Thus, a device waking up and discovering it is in a geographical location/region that is on the black list may automatically trigger the kill switch. In embodiments, a kill switch may be automatically triggered if the device "wakes up" and a USB device is connected, or if a debugging mode is enabled for the device (e.g., ADB for Android), or if the device is already awake and a USB device is connected or debugging is enabled. In embodiments, an authenticated mechanism may be provided that allows an authorized user to turn off this feature. A user or authorized administrator may change the geographical white lists or black lists from time to time to accommodate planned user travels or changes in risk associated with a geographical region or location. The entries in such a white list or black list can be associated with an effective range of dates.

In an embodiment a device policy may be configured to decide whether to allow an otherwise authorized request. In an embodiment, the response is not simply a yes or no. Rather, the response may map one requested action into another. For example, the requesting party may be authorized to request the device be killed, but the user may have configured a local device policy that modifies a kill request into a lock request, that is, the policy maps the kill request into a lock request. Similarly, a wipe request may be modified or mapped into a back-up request, or a request to back-up and encrypt data on the device. Thus, a user may report that they have lost their phone and authorize the system to run the lost phone policy. In an embodiment, an administrator that chooses which policy to run (e.g., when a user authorizes multiple actions). One or more of the actions may require authorization from another party.

In an embodiment, the server may be considered as having an authorized command, or a digitally signed command (e.g., a missing device command) when there is a digital signature involved with a pre-provisioned trust anchor. That is, a command itself has a cryptographic authorization associated with it. The authorization may be a single part cryptographic authorization and the authorization may be done by the server or the user. In an implementation, the trust anchor is different from SSL certificates in that the system may only listen to commands from an authorized party. For example, take an SSL certificate proof of trust. If dm.lookout.com presents something that chains up to the SSL certificate proof of trust, then that may be a first anchor. Thus, for example, if a Lookout certificate is burned into the device (or otherwise provisioned in a secure manner on the device), any command that chains up to it, e.g., that is signed by that certificate, may be accepted so that all commands are signed to a particular device by a possessor of that certificate. E.g., a server may have a copy of the certificate that is provisioned on the device; the server can sign commands that are sent to the device, and the device can accept such commands because they have been signed by the certificate on the device. In another example, a server used to perform a particular operation via a particular command (e.g., kill, un-kill, etc.) may have a certificate that chains up to the certificate that is provisioned on the device. Additionally, this certificate on the server may include a restriction that the certificate can be used to sign only a particular type of command, e.g., a kill command. The device, upon receiving a command signed by this certificate, can determine that the command is signed by a certificate that has been empowered to sign that particular type of command, and that the signing certificate chains up to the certificate that is provisioned on the device.

In an embodiment, a verified command uses cryptography. In this embodiment, a verified action request uses pre-provisioned authorization material (e.g., a certificate, a public key, a private key, or an encrypted blob) on the device. The authorization material must authorize the command for the command to be performed. The command is authorized based on the authorization material. There can be a cryptographically verified command—a digitally signed request or a cryptographically authenticated request (e.g., using HMAC) —sent to a device to perform an action, such as in a missing or lost device scenario. A feature of the system provides for a secure request, which may be different from a secure channel. That is, the secure request can be sent over a secure channel (e.g., SSL), or an unsecured channel.

In an embodiment employing an SMS messaging mechanism, the address of the device may be known and a controller may not be required. Rather, the system may send a particularly crafted message that is digitally signed. In the verified action request embodiment, this is elevated in importance, particularly if there's no controller, because rather than having a secure channel, it might be preferable to transmit to the address of a device via SMS. This is possible because, for example, knowledge of the IP address in an IPV6 environment may allow for connections to the device. Similarly, connections to the device may be via an e-mail or a Google GChat. A user may want to send the device a request that only the user can authorize, with the device subsequently cryptographically verifying the request. This may be particularly useful where SSL is not trusted and there is no other sort of secure transport mechanism, e.g., when there are intervening state security forces. The request may be implicitly authorizing.

An embodiment provides for a cryptographically delivered action request that is cryptographically verified in terms of authentication via pre-provisioned authentication credentials. In the embodiment, a cryptographically verified request may be sent regardless of whether the channel is secured or unsecured. The device may verify the action based on a digital signature that it receives from the controller. In an embodiment, ultimately, the device itself may decide whether or not to perform the action. Cryptography is used to verify the request according to the credentials pre-provisioned on the device, that is, determine whether the request is an authorized request, e.g., an authenticated and authorized request.

In an embodiment, a local device policy stored on the device may deny the request even though the request is otherwise authenticated and authorized. In an embodiment, the local policy may map one action to a different action.

In an embodiment, the local device policy is a pass-through device policy in which the device may authenticate that the cryptographically verified action request meets the credentials with which the device was pre-provisioned. In other words, the embodiment may begin and end with the device. It may begin with the provisioning of the credentials onto the device. And it may end with the action or request received by the device and being verified by the device. Multiple parties may also provide credentials in this embodiment.

Figure 17:
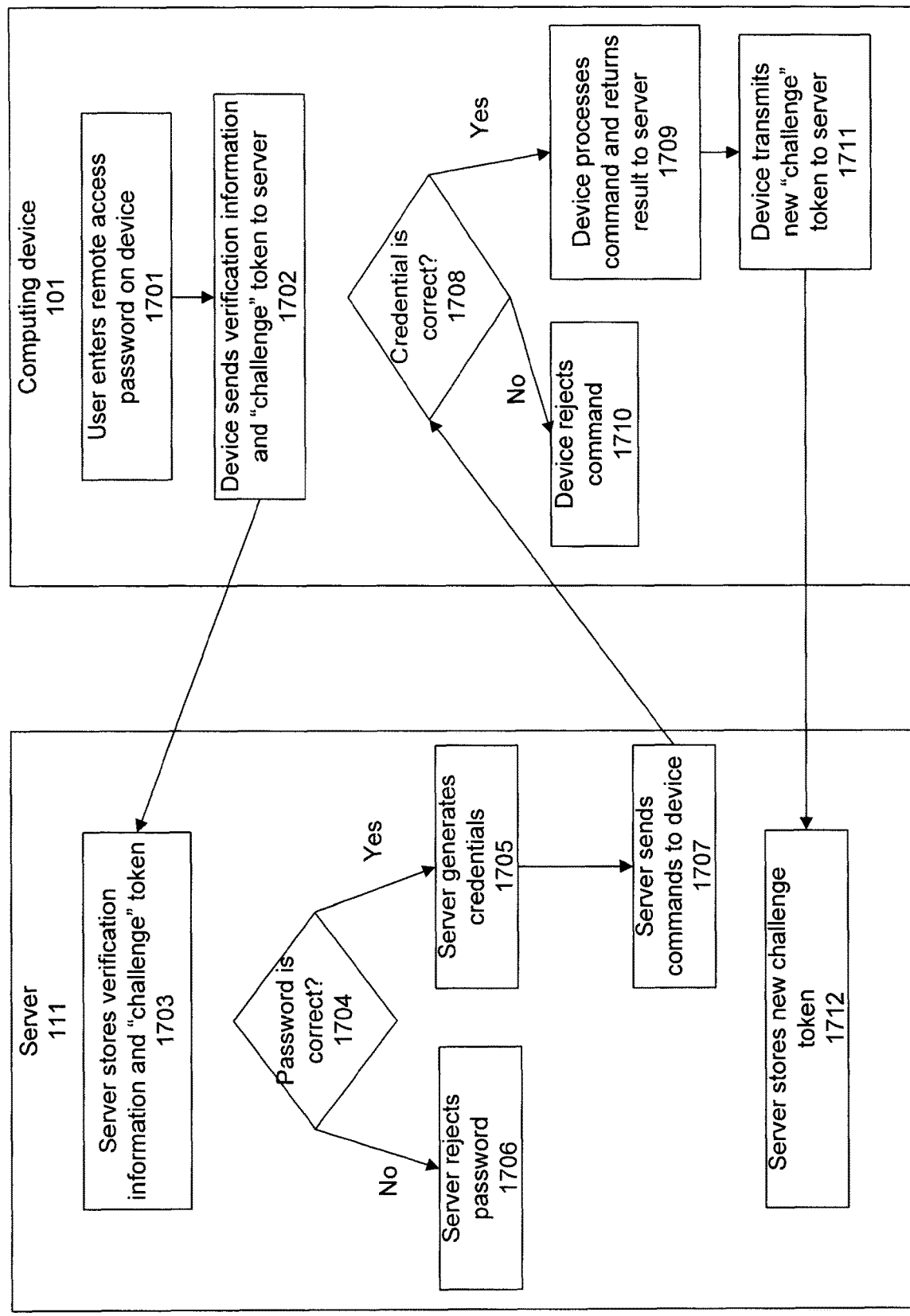
FIG. 17 shows another flow for multiparty authentication.

FIG. 17 shows another more detailed flow diagram for multiparty authentication or authorization. In this embodiment, the system may be configured so that a local software component on the device 101 only accepts commands from the server that are accompanied with special remote access authentication credentials.

In an embodiment with reference to FIG. 17, the server 111 can only generate the remote access authentication credentials in a short period of time with information supplied by the user. The local software component on the device is initially configured with its special remote access authentication credentials. The credentials themselves are not sent to the server.

At 1702, the device generates verification information and a "challenge" token and transmits them to the server. At 1703, the verification information and "challenge" token are stored by the server. At 1704, when user-supplied authentication information is received by the server, the server uses the verification information to check whether the user-supplied authentication information is correct.

At 1705, if the authentication information is correct, the server combines the user-supplied authentication information with the "challenge" token to generate the remote access authentication credentials. At 1706, if the authentication information is not correct, the server does not generate the remote access credentials.

At 1707, when the server has valid authentication credentials, it transmits a command to the device along with the valid credentials. At 1708, the device receives the command and checks the credential. At 1709, if the credential is valid, the device processes the command and returns its results to the server. At 1710, if the credential is not valid, the device rejects the command.

At 1711, if the device requests that the server change the "challenge" token, then at 1712, the server will store the new token and discard the old token. The device may request the "challenge" token to be changed periodically or upon certain events to prevent attacks where previously used credentials are replayed to the device.

In a further embodiment, the remote access authentication credential is generated using a special remote access password. At 1701, the user sets the remote access password on the device. At 1702, when the remote access password is set on the device, the device generates verification information and a "challenge" token and transmits them to the server.

The verification information includes a random salt used for password verification and the result of hashing the password with the verification salt. The "challenge" token is a second random salt used to generate the authentication credential and not equal to the first salt. At 1703, the server stores the verification information and the "challenge" token.

For the mobile device to perform an action, the server supplies the command along with the correct authentication credential. The correct authentication credential is the result of hashing the password with the "challenge" salt using an algorithm, such as SHA-1. Because the server does not have the original password, it is considered mathematically infeasible for the server to generate the correct authentication credential without the user supplying the correct password, so long as the hash function in use is considered cryptographically effective.

Because the server has the verification salt and the expected output of hashing the password with the verification salt, the server can verify whether or not a given password entered by the user is correct. When the user requests a remote access command that requires an authentication credential through the remote access web page, the user is asked to supply the remote access password for the device. The user supplies the remote access password to the server by entering it on the remote access web page and sending the password to the server.

At 1704, the server hashes the password with the verification salt and compares it to the expected verification hash result. At 1705, if the password is correct, the server hashes the password with the "challenge" salt to build the authentication credential. At 1706, if the password is incorrect, the server informs the user via the remote access web page.

The password is discarded after the authentication credential is generated. The server only temporarily stores the authentication credential while it is sending commands to the device and receiving status from the device corresponding to the secured remote access commands. After the credential is not needed for specific commands requested by the user, it is discarded.

At 1711, after any commands are completed, the software on the mobile device may send a new "challenge" salt to the server to prevent the server from using the previous authentication credential again. At 1712, after receiving the new "challenge" salt, the server discards the old "challenge" salt.

In an alternative embodiment, the server supplies the remote access web page with the password verification hash, the password verification salt, and the "challenge" salt so that the remote access web page can generate the authentication token without sending the remote access password to the server. When the user enters a password on the remote access web page, software in the web page, written in a language such as JavaScript, hashes the password with the verification salt and compares it to the expected verification hash result to determine whether or not the password is correct. If the user enters the correct password, the remote access web page generates the authentication credential by hashing the password with the "challenge" salt and sends it to the server. The server can then send the desired remote access command to the device with the correct remote access credential.

Referring again to FIG. 3, a party may be referred to as an authorizer. In an embodiment, an authorizer has some relationship with the controller. When the party does not have possession over the target device, that relationship may be, for example, through a Web browser on a different device. Thus, the relationship with the controller may be, e.g., directly through the Web browser on a computer mobile device, or via a call center to a security service provider, or to a call center of a carrier.

In an embodiment, an identity service provider may interact with the parties and provide authentication and authorization credentials and sign on. In this embodiment, the parties may also include the security service provider and the controller. The device owner and the controller, individually, do not have enough information to kill the device. The user or device owner may interact with the identity service provider. The identity service provider may provide or access an escrow, or perform a cryptographic transaction on the user's behalf that enables or authorizes the controller to execute an action, such as a kill. Consider, as an example, the following scenario. The device itself is keyed to the user's Google+ account. To kill the user's device, a public key associated with the user's Google+ account requires a signed message from the user's Google+ account delivered over the controller's secure mechanism. To initiate the kill, a user may access the Web site, push a button or otherwise make a selection to kill the device. An OAuth or equivalent protocol provides a signed thing such as an access token to Google+, the signed thing authorizing Google+ to perform the associated action. Google+ provides the signed thing to the controller, which in turn provides the signed thing to the device and the kill (or other action) happens.

In an embodiment, rather than employing the user's personal Google+ account, the user's enterprise Google apps corporate account is employed. User authentication can be performed using a single sign-on provider, or via the use of a hash message authentication code (HMAC), or it may be done with public keys, or any number of competent techniques. The token may be with JSON web token (JWT), which is a form of either HMAC or a public key cryptography. Requiring a user to provide a password to kill a device can be problematic because passwords are often difficult to remember. An identity service provider solves that problem as part of two-party authorization.

In an embodiment, and with reference to FIG. 1, there is a device, a security server or cloud controller, and two authorizers. In an embodiment, the owner (user A, not shown) of the device client 105 and an authorizer are the same person. In an embodiment, user A may obtain possession of device client 105 after having reported device client 105 lost or stolen, at which time user A's use of a password with which user A normally accesses device client 105 may be an authorization—this embodiment represents a consumer approach.

In an embodiment, an authorizer is a service provider, cloud controller, or carrier representative with access to customer care console 115. Upon a customer call reporting that device client 105 has been lost or stolen, the representative may be able to remotely lock or otherwise disable device client 105. Thus, the system is able to institute security features in addition to requiring two-party authorization or authentication.

Flow: Enrolling Second Factor Clients

In embodiments, second factor clients may be enrolled at any time, including both before and after an event, such as the apparent loss of a device. In embodiments in which second factor clients are enrolled before an event, second factor clients may be enrolled by an administrator of a device 105, which may include an authorized user or operator or owner, an enterprise administrator for a smartphone, or a parent or guardian of a user of device 105. The enrollment may be performed with the user's device 105 using an application or browser on device 105, which is connected to a security server 120, or to a customer care console server system 115. The enrollment may also be performed with a PC or other device using an application or a browser. In an embodiment, to enroll a second factor client, the administrator of device 105 indicates to security server 120, or to a customer care console 115, that one or more particular users are to be designated as second factors. The administrator indicates this by supplying to security server 120 or customer care console 115: one or more identifiers that can be used for communicating with a chosen second factor user; and a selection of the type or sort of events the occurrence of which prompt the use of the chosen second factor user.

Examples of identifiers that can be used for communicating with a user include a device phone number, an email address, an instant messaging ID, and any other device communication-related ID. Examples of an event include: a login attempt for device 105 after device 105 has been flagged as missing; a login attempt after device 105 has been flagged as being in a missing-device mode and requiring a second factor for authorization; an access attempt from device 105 to an application, website, capability or function of device 105; or an access attempt from device 105 to an application or website that requires a second factor client for authorization.

Alternatively the user or owner of device 105 may have enrolled a second factor client by making a voice call to a representative of an organization that has a customer care console 115, or may have had a face-to-face conversation with a representative from an organization with access to a customer care console 115, e.g., a retail carrier phone store. A user or owner may also interact directly with customer care console 115. Regarding the user making a voice call, in this alternative, user interaction with customer care console 115 is mediated by a customer care representative whose customer care console 115 is in communication with the security server 120; that is, during the user call it is the representative who is the direct user of customer care console 115.

In one embodiment security server 120 and customer care console 115 are operated by the same organization and may use the same or different servers. In a different embodiment security server 120 is operated by one company and customer care console 115 is operated by a different organization, e.g., a carrier or insurance company or call center.

More than one second factor client may be enrolled at the same time. More than one second factor client may be active for the same device for the same type of event. In an embodiment a user may enroll a different device possessed by the user as a second factor client, e.g., a user with a smartphone (SP) and a tablet (TB) and a smartwatch (SW) may enroll them in various ways, as shown by the examples in Table 1 below:

TABLE 1

| Protected Device | Event Type | Second Factor Type & Identifier |
|---|---|---|
| SP | Missing-device-login-attempt | deviceID <tablet device identifier for TB> |
| SP | Missing-device-login-attempt | Email-ID <email for user> |
| SP | Missing-device-login-attempt | Voice phone-number <for user's own office phone> |
| TB | Missing-device-login-attempt | Device phone number <device identifier for SP> |
| TB | Missing-device-login-attempt | Email-ID <email for user> |
| TB | Missing-device-login-attempt | Voice Phone-number <for user's own office phone> |
| SW | Missing-device-login-attempt | Device phone number <device identifier for SW> |

A second factor client ID enables communication to an instance of a security application on a second factor client device 110 (also "second factor application"). Such a communication can be via a direct connection, or from a push mechanism. For example, a tablet may not have a cellular connection capability, but may have a Wi-Fi connection capability. When the tablet is connected to a Wi-Fi network, the security application on the tablet may use the Wi-Fi connection to contact the security server, which then knows that the tablet is online, and knows how to communicate with the tablet via the security application on the tablet.

Regarding types of second factor client IDs and their uses: a second factor client email-ID may be used to send messages via email; a second factor client voice phone-number may be used to place an outgoing voice call and handle responses via an interactive voice response (IVR) system; and a second factor client device phone number may be used in several ways to establish communication to the device. For example, the second factor client device phone number may establish communication to the device via a direct network connection to the security application on the device, or via a push mechanism, or via SMS or MMS, or via an IVR voice call. Other types of communication and associated identifiers are possible, e.g., a Facebook userid, which will use Facebook messaging for communication.

In embodiments, in addition to the event of a reported lost or stolen device, other types of events may be configured (or "created"). For example, theft alerts, or access attempts to a particular resource or class of resources, may be configured as events. In embodiments, a theft alert is configured to result from detecting an activity, or a combination of activities, on a device that is suspicious or may indicate that someone other than the authorized user is in possession of the device. Examples of activity that may factor in whether to issue a theft alert include: the incorrect entering of a device, application, or website password or passcode; the removal of a device SIM card; the removal of the device housing cover; the enabling of airplane mode; an attempt to turn off the device; and an attempt to alter device security settings, such as an attempt to remove the security system, or remove a device administrator.

In embodiments, device 105 or security system 120 may include an automated system that can be configured to respond to a detected activity or combination of activities by setting a flag in security system 120 that indicates device 105 is missing. The setting of such a flag may result in the system initiating two-party authorization for device 105.

As with the event of a reported lost or stolen device, a designated second factor client that may authorize device use after a theft alert is issued for a device 105 may include other communications identifiers that identify other devices associated with the user of device 105.

In embodiment, events involving access attempts to a particular resource or class of resources are used in several situations, e.g., a parent or guardian overseeing the use of a child's device, or an enterprise administrator overseeing usage of a BYOD, or enterprise-owned device. In such situations the overseer may designate a white-listed set of resources or class of resources, such as a set of websites, or network addresses, or geographic locations thereof, or of allowed cloud service providers. The overseer may also configure the system to contact the second factor clients if an attempt is made to access something that is not on the white list. Alternatively, or in addition, the overseer may designate a black-listed set of prohibited resources or classes of resource, and configure the system to contact the second factor clients if an attempt is made to access something on the black list. For example, an enterprise administrator may have enrolled a set of enterprise administrators as second party clients to be notified in the event of attempts to access websites or network addresses located in a list of proscribed countries, such as China or Russia, or in the event of attempts to access cloud service providers not on an approved white list. The white list or black list designated by the overseer may be dependent on an attribute of the primary user of the device; e.g., a parent or guardian overseeing the use of a child's device may designate an age-appropriate white list or black list for the child's device, or an enterprise administrator may designate a white list or black list associated with the enterprise role of the employee user.

In an embodiment, an enrolled second factor client may also be an automated security server process that is configured to reply "yes" to second factor requests in designated situations. In an embodiment, an automated security server process is configured to reply "yes" to second factor requests and log the requests to construct an audit trail of access attempts. An automated security server process enrolled as a second factor client may take other actions, such as notifying security administrators, changing a security state on the device 105, or other actions on the device or on server-based security systems.

In an embodiment, the security server 120 may enroll itself or one of its processes as a second factor client for certain types or categories of events. The types of categories or events may include, for example: events related to theft alerts, events indicative of a loss of possession of device 105, or events in which the security server 120 wishes to gather extra contextual information for possible later use in second factor messaging to other second factor clients for other events, for device location, or for recovery.

For example, an example of an event indicating a possible loss of possession is when sensors 250 on the device have detected (e.g., via the accelerometer) a fall of the device. Such an initial detection may also be followed or confirmed by a configurable amount of time in which the sensors did not detect evidence that the device moved. Such an event or events may indicate that the device has fallen from a user's pocket or handbag, the fall was unnoticed, and the user has moved away from the device without realizing that the device is no longer in the user's possession. An automated second factor client reply in such case may be simply "yes," indicating that the device should continue with its operation. Or the reply may be "yes," with instructions that the device should obtain and transmit certain contextual information, such as the location of the device or a photo or video or audio recording of the environment of the device.

The transmission may be made to the security server, or second factor clients, or both. Optionally the response could instruct the device to lock, or to wipe data, or to sound an alarm.

Another example of an event indicating a possible loss of possession is when an existing network pairing or tethering operation has terminated. Such a pairing or operation may include a connection via Bluetooth to another device being carried by the user (e.g., a fitness band, authentication device, or headphones). The termination may indicate that the user has moved away from the device and is no longer in possession of it. As discussed above, an automated second factor client reply in such case may be simply "yes," indicating that the device should continue with its operation. Or the reply may be "yes," with instructions that the device should obtain and transmit certain contextual information, such as the location of the device or a photo or video or audio recording of the environment of the device. The transmission may be made to the security server or second factor clients or both. Optionally the response could instruct the device to lock, or to wipe data, or to sound an alarm. The use of proximity for changing the security behavior of a device is further described in U.S. patent application Ser. No. 14/207,100, filed Mar. 12, 2014, which is incorporated by reference.

In embodiments, the instantiation of an automated processor of a configured event may execute on the security server, on the device itself, or on a combination of the two locations.

An example of a type of event used primarily for contextual information gathering for possible later use occurs after a user has lost possession of the device. The type of event includes events that may indicate that an unexpected user (a benign finder or a malicious thief) has found the device and is beginning to interact with it. For example, upon detection of any of the following events, an instantiation of an automated processor (e.g., on the device or on the server), may direct the gathering of certain contextual information: a device proximity ranging sensor detects that device has been removed from an enclosing container, e.g., a pocket or bag; a device sensor detects motion of the device, e.g., a person lifting device to hold in front of them or to set on a surface to attempt to unlock it; a power button is pressed (when device is either powered on or powered down); a device boot event is completed; a display turns on; a device lock screen is displayed; a device unlock icon is moved, or a swipe gesture to unlock the device is made; a device initial unlock entry screen is displayed after an unlock attempt; a device proximity ranging sensor detects a finger or object approaching the device interaction touch surface; a device screen touch is detected; a keyboard input is detected; an "enter" on an unlock entry screen is detected; a successful login occurs; or an unsuccessful login attempt is detected.

Types of contextual information gathered may include: device location; other information which can be used to determine device location, such as which cell towers or Wi-Fi networks are detected in the area of the device; and photos, sequences of photos, video, or audio recorded during and subsequent to the detected event. In some cases the contextual information so gathered will be sent directly to the security server. In other cases the device may store the contextual information locally on the device for later transmission. The later transmission may be made at a configurable time or frequency, upon request from the security server, or if the security application on the device determines that it should be sent to the server. For example, contextual information may be gathered at every event listed above. In embodiments, such gathered contextual information may only be sent to the security server upon the detection of a login unsuccessful event. Regarding the list of events above, it may be that the list itself describes a sequence of events that would occur during a valid or invalid attempt by any user, authorized or not, to unlock and use a device. A sequence of such events that terminates with a successful login may indicate that the contextual information is no longer required.

Capturing contextual information in advance of a confirmed or reported lost or stolen device may be beneficial because, though a thief may cover the device front facing camera during an unlock attempt to avoid a "theftie" (i.e., a photo taken by the device in an attempt to capture an image of a potential thief), triggering the gathering of device contextual information in advance may capture meaningful and useful context (photos, videos, device location) that will subsequently prove important.

The gathering of contextual information is highly configurable. For example, when a device is gathering contextual information such as a photo from the front-facing or rear-facing camera, the device may take a sequence of photos based on a configurable amount of time between them, or based on the continued detection of motion of the device. Such a sequence of photos can optionally be stitched together into a panorama showing a more complete area of the surroundings of the device, or may be turned into a time-lapse movie or animated image showing the temporal sequence of such contextual photos.

The effect that events may have on the triggering of second factor processing may be modified by other contextual factors. For example, unsuccessful login attempts may not contribute to triggering second factor processing when the device is determined to be located at the user's home. The use of contexts is further described in U.S. patent application Ser. No. 13/686,028, filed Nov. 27, 2012, now U.S. Pat. No. 8,655,307, which is incorporated by reference.

Another type of event that may be configured to initiate or contribute to the initiation of second factor processing is the entry into or exit from a defined geotemporal fence. A geotemporal fence is a combination of a designated type of time interval and a designated geographical region. A time interval may include, for example, non-working hours from 5 p.m. until 8 a.m., or may only be weekdays (Monday through Friday), and so on. A particular geographical region may be fine or coarse grained. For example, the area surrounding a user's home or workplace for a radius of one block may be a fine-grained geographical region, and a coarse-grained geographical region may be the New York City metropolitan area. In one example, a parent or guardian may configure as a second factor event the exit from a geotemporal region defined as the area within one block of their child's school, during weekdays, and during normal school hours of 7:30 a.m. to 3:30 p.m. Such an event would be registered by the system (or "triggered," that is, the system notes the event has occurred) upon the child's device exiting the defined geotemporal region. Another example is a theft area geotemporal event.

Regarding theft areas, there may be particular areas from which a high number of lost or stolen phone reports have been received. For example, these may correlate to high crime areas in any given city. Also, most such reports may be made within a certain part of the day, e.g., from 5 p.m. until 2 a.m., or on certain days of the week. Thus, there may be both temporal and geographical components to a theft area. Information regarding theft areas is available from a number of sources, including publicly accessible crime reports and reports on internet forums or social media. The system can gather such theft area information to use in configuring theft area second factor events.

A second factor event can be configured for any geotemporal region, not only a theft area. But in the case of the example of a second factor event configured for a geotemporal theft area, in a preferred embodiment the user's own device 105 and the user's email are enrolled as the second factor clients for the theft area event. When such a theft area event is registered, the system sends a notification message to the second factor clients (including at the device 105) informing them that the device 105 has entered a theft area. The second factor event may be configured so that notification is the only action taken, or may be configured to require that the user respond and acknowledge the notification. Additional actions may include system changing the security settings of the device. Such changed security setting, for example, may include changes that support geolocation breadcrumbing at a more frequent interval ("breadcrumbing" is the periodic sending to the security server of the device location), or that shorten the timeout period for automatically locking an idle device, or that adjust other security settings on the device.

In embodiments, the user may click through a theft area notification to receive more information about individual or aggregate theft area information, such as the number of device thefts, whether they involved violence or not, etc. A theft area notification can be textual, in the device notification area, or can constitute other visual or auditory or vibration alerts. Optionally the theft area notification can be accompanied by tips for the user on how to avoid device theft, e.g., by removing headphones or earbuds to be more aware of the user's surroundings, by stowing the device in a pocket or bag rather than hand-carrying it or allowing it to remain visible to passersby, etc.

In embodiments, when a user installs security application 245 on device 105 some second factor clients enrollments may be created automatically. For example, the user's email address, or any other devices are associated with the same user account, may be enrolled automatically as second factor clients. Additional automatically-enrolled second factor clients may include any designated emergency contacts on the user's device. In embodiments, the user may be prompted to confirm that such potential second factor clients should actually be enrolled. Subsequent changes to a list of designated emergency contacts on the device may be processed in a similar fashion either by automatic enrollment or un-enrollment or by prompting the user and handling the user's response.

Flow: User Report of Missing Device

Embodiments will be illustrated by considering the scenario in which the user of device 105 has lost possession of the device. In such a scenario, the user may not know if the device was lost or if it was stolen. Using a Web browser the user may connect to security server 120 and indicate that device 105 is missing. Security server 120 will then instruct device 105 that any subsequent attempted login on device 105 will require second factor authorization according to the configured second factor protocol. Alternatively, the user may speak with a customer representative with access to a customer care console via a phone or in person (e.g., at a carrier retail store) to perform the same function. The representative may use the customer care console to communicate with the security server 120 to indicate that the device is missing. It should be noted that, for device 105 to respond to instructions from security server 120, the security application must have already been installed on or preloaded on device 105. In a different embodiment the user may connect directly to a version of the customer care console application, or web-application, that has been configured to allow a customer (rather than a customer representative) to use it directly.

A user report that the device is missing is itself a type of event for which second factor clients may be enrolled and may receive notifications. For example, all second factor clients enrolled for login attempts after missing device-type events may be sent a message at the time that the user reports the device is missing. The message may alert the second factor client that the device is missing and to expect that they may be asked to reply "yes" or "no" to subsequent login attempts on the relevant device. An advantage of such an alert is that an alerted second factor client may assist in the recovery of the device. The second factor client may also have another channel for communicating with the proper user of the missing device (e.g., the proper user may have access to a friend's phone). Thus, if the proper user has recovered the device, the proper user may notify the enrolled second factor client that the device has been recovered, and that the second factor client should reply "yes" to a subsequent second factor authorization request.

Flow: Login Attempt on Device 105

Embodiments related to configured second factor events and how they are handled will be illustrated by considering the scenario in which device 105 has been reported (or "marked" or "flagged") as lost or stolen (i.e., missing) and there is a subsequent attempt to login on device 105.

In such embodiments, if device 105 has not been marked as missing then normal login procedures are used. But if device has been marked as missing any attempted login (successful or unsuccessful) on device 105 may cause security application 245 on device 105 to send a message to security server 120. This message may be sent using a direct network connection over, e.g., hardwire links, optical links, satellite or other wireless communications links, wave propagation links, or any other mechanisms for communication of information, or via SMS or MMS messaging or via email or via any other mode of communication from device 105 to server 120. The message may inform the receiving second factor client that there has been a successful or unsuccessful attempt to login on device 105. The message may also contain contextual information, such as the location of the device, other information that can be used to determine where the device was, or information that may identify the person attempting to login on the device (e.g., a photo or video from the front-facing and/or rear-facing camera on the device). The second factor client may be prompted to respond with a "yes" or a "no" to authorize or not the login attempt on the device. When there is a plurality of second factor clients enrolled for a type of event the system may be configured to authorize the attempt on any "yes," to disallow the attempt on any "no," to authorize the attempt only if all responses are "yes," or to authorize the attempt if at least some configurable number k "yes" responses are received, etc.

Flow: Resource Access Attempt on Device 105

Embodiments related to configured second factor events and how they are handled will be illustrated by considering scenarios in which the use of device 105 is somehow constrained, e.g., the use of device 105 is being monitored by, for example, a parent, guardian, or administrator (enterprise or other). In such scenarios, a configured second factor event may be an attempt to access a particular resource. In a parent/guardian scenario, an attempt to access to a resource not on a designated white list, or to access a resource on a black list, may be configured as an event that results in the sending of a message to the second factor clients (in this case, the parent/guardian). The message may inform parent/guardian, for example, of the particular resource involved, and prompt the parent/guardian to authorize or deny access to the resource (e.g., "Permit access: yes or no?"). In an embodiment, the parent/guardian may respond with "maybe," ask for additional information, or instruct the child/ward to call the parent/guardian. In the case of an instruction to call, the system may support a continued dialog between the device and second factor client that may result in the "maybe" changing to a "yes" or "no." The second factor client's response may also include instructions for the security server to change the security settings on the device. In another embodiment, when there are, for example, a mother and a father both enrolled as second factor clients for these events, a first second factor client, e.g., the father, may respond with a delegation response, "ask your mother," which will involve the response from the mother being the determining response for whether access is allowed or not.

Other examples of resource accesses configured as second factor events may include attempts to download or install applications, and attempts to make a payment (either an in-application purchase or a real-world purchase of goods or services using the payment capabilities of the device). A configured second factor payment event may be configurable based on: a threshold payment amount; a white list or black list of particular goods, services, or service providers; classes or categories of goods, services, or service providers; or whether the device has been reported as missing. In an embodiment a configured second factor payment event may have been configured to deny payment services from a device if the device has been reported as missing, and optionally to notify the payment service or payment processor to which the device is connecting that the device has been reported as missing. Generally, resource accesses configured as second factor events may be further configurable based on any characteristic of the resource.

For an administrator scenario, examples of configurable second factor resource access events may include attempts for the device to communicate over a network with a particular non-white-listed location, a black-listed location, or a cloud services provider not on an enterprise white list of cloud services providers. Such a cloud services provider could be, for example, a provider of online cloud storage services. In an embodiment, after an attempt to access a particular resource, an enterprise administrator enrolled as a second factor client may be sent an attempted-access message that indicates: an attempt was made to access the particular resource; and which device was used to make the attempt (and the user responsible for the device). The message may prompt the administrator to authorize or deny the request. The message may also allow the administrator to respond with a message to the device user that accompanies the authorization or denial, e.g., "yes, but let me know why you need access to this resource so we can white-list it." In an embodiment the administrator may reply with a "maybe" and initiate a dialog. Such a dialog may be conducted out-of-band via some other communications means, or may be mediated by the security server supporting messaging, an initiated voice call, or VoIP call. As with the parent/guardian scenario, the dialog may result in a subsequent authorization or denial of the access. In an embodiment a second factor resource access event may be configured to collect some contextual information regarding the resource access event, e.g., information related to or derived from a resource (e.g., a file) for which an attempt is being made to transmit the resource to a cloud service. The information may include a part of or all of the resource, or hashes of portions of or all of the resource. In such a situation a second factor resource access event is configurable to accomplish Data Loss Prevention (DLP) functionality, in which approval ("yes") or denial ("no") responses by the second factor enforce an enterprise data movement policy.

In an embodiment, should no second factor client respond to an event with a "yes" or a "no" response, after a configurable amount of time the system may be configured to: react as if a "yes" response had been received; react or as if a "no" response had been received; or change the security state of the device. An effect of a changed security state may be, for example, that use of device is partially allowed in that only a reduced set of apps or services may be accessed.

Figure 18:
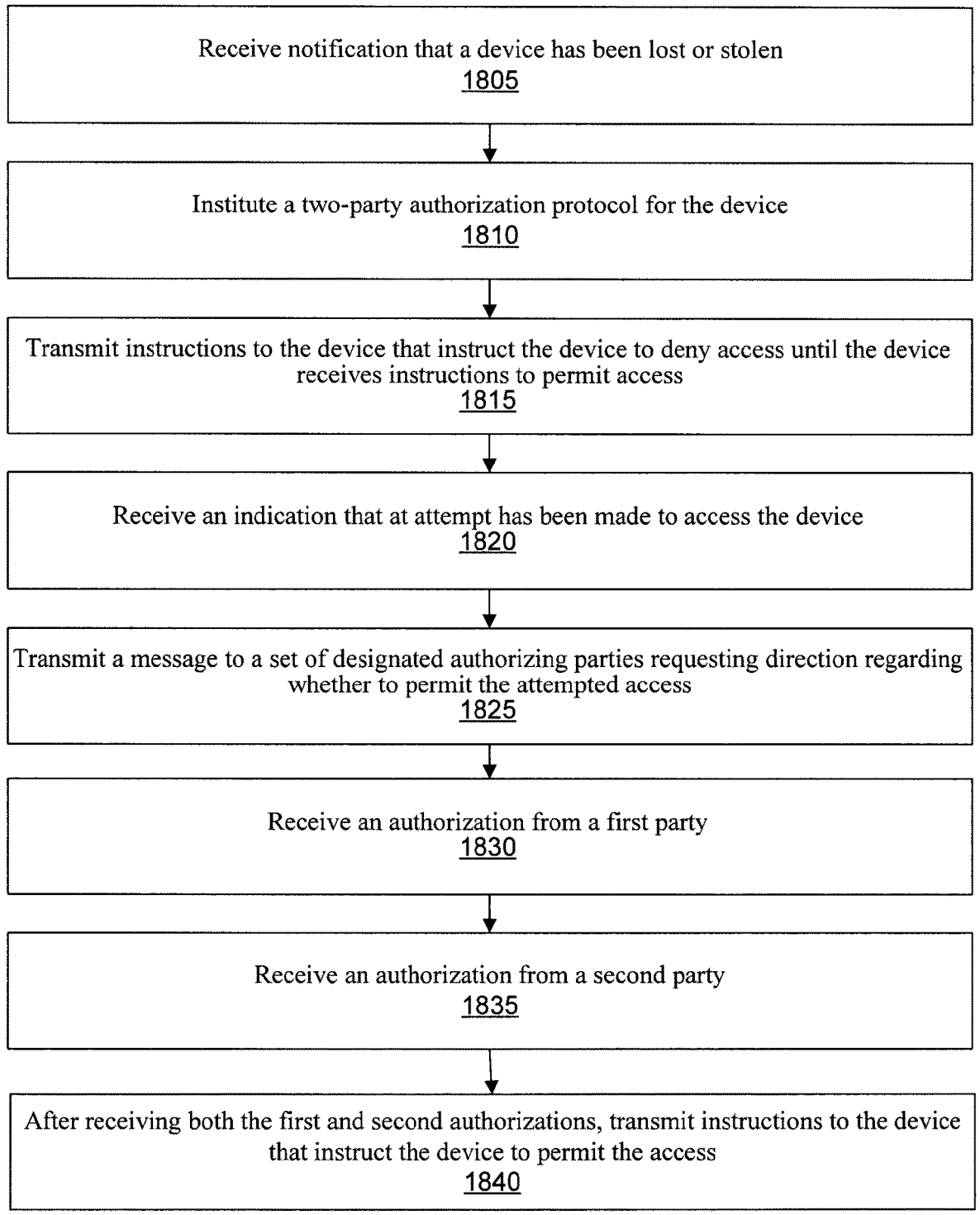
FIG. 18 shows an overall flow diagram for two-party authorization.

FIG. 18 shows an overall flow diagram for a method 400 for two-party authorization. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In brief, in step 1805, the system receives notification that a device has been lost or stolen. In step 1810, the system institutes a two-party authorization protocol for the device. In step 1815, the system transmits instructions to the device that instruct the device to deny access until the device receives instructions to permit access. In step 1820, the system receives an indication that at attempt has been made to access the device. In step 1825, the system transmits a message to a set of designated authorizing parties requesting direction regarding whether to permit the attempted access. In step 1830, the system receives an authorization from a first party, which in most instances may be the use of the password for the device, perhaps by the proper user of the device. In step 1835, the system receives an authorization from a second party. In step 1840, after receiving both the first and second authorizations, the system transmits instructions to the device that instruct the device to permit the attempted access.

In an embodiment, components of the system that perform the steps of method 1800 may be located on one or more servers, or on the device, itself, or distributed arbitrarily on both the server(s) and the device.

Embodiments of the system for instituting two-party authorization are further illustrated using the following examples. In an example, user A of device 305 has pre-designated a plurality of other users B1, B2, . . . Bn as "lost device buddies" by identifying some identifier by which a communication can go to them (SMS, email, other device push, etc.). User A notices that device 305 has been lost or stolen and contacts first party 310 to have device marked as "lost or stolen." Subsequent to this marking, any attempt to login to device 305 by anyone will require a two-factor authorization process in which a message is sent to B1, B2, . . . Bn: the "lost device buddies" (or "B1 . . . Bn," or "buddy Bi"). That is, an attempt to unlock the device from the lock screen, or to login to a user account on device 305 will result in an attempted-login message being sent to buddy Bi. The attempted-login message may identify the device and request authorization for the access to be allowed, e.g.: "User A's device 305 has someone trying to login; should it be allowed?" The attempted-login message may contain information to assist in recovering the device, such as the current location of device 305 and/or other context info, such as a photo taken at time of login or attempted access of user attempting the login or access, or audio or video captured at that time. The use of accompanying content info such as a photo of the user attempting the login or access can facilitate operation in restoring normal operation (vs. missing device mode operation) after the legitimate user has recovered the formerly missing device: the second factor requested to authorize the login or access attempt can recognize the legitimate user in the accompanying photo and respond "yes." Additionally, the second factor can supply an indication to the security server that the device should no longer be considered as a missing device. In an embodiment a configured second factor can be an automated facial recognition system that can determine that the legitimate user is the one attempting the login or access.

Responses by the buddy Bi to the attempted-login message prompt the system to allow or deny login depending on set, but changeable, criteria. In an example, any positive authorization response (e.g., "yes") by any one of buddy Bi is sufficient. That is, if any of buddy Bi say "yes" then the login is allowed. In this example the use of a password by the possessor of the "lost" device is considered the first authorization, or first "second factor."

In an example, any negative response (e.g., "no") by any one of the buddy Bi is sufficient to prevent a subsequent login. That is, if any of the buddy Bi say "no" then the login is not allowed. In a different example, a subset of the buddy Bi must respond positively for the login to be allowed. That is, if the subset requires that k lost device buddies respond positively, then login will be allowed when k or more of buddy Bi respond positively. Conversely, login will not be allowed when fewer than k of the buddy Bi respond positively. In this third case, the use of the password by the possessor may or may not be considered one of the required subset "k."

Regarding the identity of the buddy Bi, these may include any arbitrary list of contacts. For example, the buddy Bi may include user A's family, friends, or emergency contacts, such as those contacts listed under In Case of Emergency (ICE) in user A's contacts or those contacts listed in ICE-related applications within the device. In an embodiment, the selection of such ICE contacts is automatic. The buddy Bi may also include a co-traveler or other person with whom user A expects to be in contact, which could be advantageous because their proximity could assist in recovering device 305. If upon reporting device 305 lost or stolen, user A had not pre-designated any buddy Bi, then user A may designate some at that time. Generally, buddy Bi may be changed or added at any time by user A logging in to their user account on the web, or from another device. Additionally, user A may call their carrier or phone insurance company and direct that the buddy Bi be changed or added via a customer care console a security provider, e.g., Lookout, provides to the carrier and/or insurance company. After such a carrier, insurance company, or security provider has been somehow involved, a customer-care representative may also be designated or otherwise act as a buddy Bi The attempted-login message may be sent to the buddy Bi in a variety of ways and formats. For example: it may be sent as a message from the server directly to the buddy Bi; or it may be sent as instructions from the server to device 305 that instruct device 305 to send the actual message to the buddy Bi. In latter of these examples, if it is determined that device 305 cannot be reached from the server or that device 305 cannot send message(s), then the system may revert to sending the attempted-login message directly from the server.

The server may be provided by the security provider, e.g., Lookout, or may be provided by the carrier, or the device insurance company. The server may also be provided by an enterprise, if, for example, the device has an associated use as a BYOD device or is a company-owned device. In embodiments, components of the software for the system described within this application may be instantiated on the server, or the device itself, or both.

Additional embodiments of the system may include the following actions taken at the time of reporting the device lost or stolen: provisioning the device with a lock code had one not been in effect previously; or locking the device immediately.

Additional embodiments of the system may include the following regarding notice messages. At the time of reporting device lost or stolen, the user A may provide an updated notice message. The notice message may include alternate contact information and instructions such as the phone number of a device carried by a person who is with user A at the moment, e.g.: "My phone is missing; call Joe at 555-555-1212 to reach me and please say 'no' if requested to approve a login until further notice." The notice message may be transmitted at the time of reporting to the buddy Bi. Such an optional notice message has the benefits of preventing the buddy Bi from reflexively responding positively to an attempted-login message and of putting buddy Bi on the lookout for the lost device.

In embodiments, at the time of enrolling someone as an authorizing buddy Bi, an enrollment message may be sent to the new buddy Bi. The enrollment message may originate from (a) a server involved in enrolling buddy Bi, or (b) from the device 305, itself. For the enrollment message to originate from device 305 itself, device 305 may receive a command from a server involved in enrolling buddy Bi that directs or otherwise indicates that device 305 should send an enrollment message. In embodiments, user A of device 305 may enroll a buddy Bi directly from device 305 using an application or browser running on device 305. In such instances, the new buddy Bi enrollment information is sent to the server, and the enrollment message may be sent from the server or device 305 as described earlier.

It is an advantage of the embodiments that after user A has reported device 305 lost or stolen the designated buddy Bi provide an extra authorization factor beyond any password protection device 305 already has. Additionally, the designated buddy Bi may or may not have rights to access the device, or to access the security account (e.g., Lookout account) for user A, or device 305. In embodiments, subsets of buddy Bi may be arranged in a hierarchy with the different subsets of buddy Bi receiving different access rights depending on their standing in the hierarchy. For example, one subset of buddy Bi could be provided with a "buddy access password," so that, should they come into possession of device 305, the subset could access features of device 305, e.g., to send a message to all buddy Bi stating "I [possessor buddy Bi] have device 305."

In embodiments, two-party authorization is activated and buddy Bi are notified automatically, i.e., before device 305 has been reported lost or stolen. The security component running either on the server or device 305 may determine that such automatic activation is appropriate for reasons related to the capacity or the security of user A or device 305, also as determined by the security component. For example, it may be determined that user A is incapacitated or otherwise unable to reach a communications device or phone to report device 305 lost or stolen. In another example, it may be determined that an undue security risk exists or the device may be lost or stolen due to the presence of one or more indicators. Such indicators may include: user A is traveling in a high-risk country; device 305 is not in a "normal location" for user A, where "normal location" may be defined by geography, or both geography and time; device 305 has recorded a configurable number of unsuccessful attempts to unlock device 305; device 305 has recorded a configurable number of unsuccessful attempts to login to an application or a website from device 305; a configurable amount of time has elapsed since the last successful login or authorization; the device has experienced a 'fall' (detected by accelerometer), which may be indicative of user A having dropped and therefore lost the device 305; device 305 has been used for an unusual activity, such as visiting a website never before or very infrequently accessed (within this application "uses" of device 305 and "activities" performed using device 305 are used interchangeably, with the use of one including the other); device 305 has sent an email or SMS or MMS to a recipient never before used; device 305 has detected typing behavior that does not match a model for user A; device 305 has detected carrying behavior that does not match a model for user A, e.g., how device 305 is being held, or, how device 305 is being carried as determined by an analysis of the apparent walking style or gait; device 305 has experienced an attempt to wipe the device; device 305 has experienced an attempt to flash the device; device 305 has connected to a network that device 305 has never before connected to; or device 305 has been used to make a purchase of any sort, such as a purchase of greater than a certain threshold amount, or a purchase of certain categories of goods/services, or a purchase at certain categories of businesses or business locations (e.g., gas station). This list of risk indicators is illustrative and not exhaustive.

In embodiments, how device 305 is used or set up may influence the list of risk indicators. For example, a device used as a BYOD device may have separate business and personal usages, and may have containers for business applications. With such a device, the list of risk indicators may expand to include: unsuccessful attempts to login to a business application or website or the container itself. Similarly, how device 305 is used or set up may influence a choice of buddy Bi. In the BYOD device example, an enterprise administrator may be an optional, automatic, or mandatory buddy Bi. Such an enterprise administrator may include all of a list of suitably authorized enterprise administrators, or an administrator that is 'on call' at a given moment.

It should be understood that any combination of indicators, such as those listed above, may be used to determine whether the risk is high enough to automatically activate two-party authorization, i.e., it may not be just one indicator that determines.

Embodiments offer advantages that may compensate for user A using lax security procedures. For example, an embodiment in which two-party authorization is automatically activated based at least in part on device 305 having recorded a configurable number of unsuccessful attempts to login to an application or a website from device 305 is especially advantageous when device 305 did not originally have a device lock PIN or password configured, or if a thief or finder of device 305 found the device while it was still unlocked. Embodiments with the ability to lock device 305 upon reporting the device lost or stolen provide a similar advantage.

Embodiments also offer advantages that may be useful in situations that are not necessarily related to a lost or stolen device or two-party authorization. For example, should device 305 detect a "fall," which is one of the risk indicators, the system may be configured to lock device 305 and yet not automatically activate two-party authorization. A detected "fall" does not necessarily indicate a lost or stolen device, but it may be considered a situation after which locking device 305 is advised—perhaps based on the assumption that device 305 fell from the pocket of user A and the next possessor of device 305 may be unknown to user A.

In embodiments, device 305 is an atypical mobile device, for example, a desktop computer or an element of the Internet of Things (IoT). In such a scenario, according to a list of indicators similar to the list of risk indicators above, two-party authorization may be activated should the atypical device perform or attempt to perform a pre-configured action. For example, should a particular financial transaction, or an interaction with a particular business or type of business or website, be initiated from a desktop computer, two-party authorization could be activated to prevent the transaction until proper authorization is received. Or, for example, should an IoT-connected refrigerator place an order for a pre-configured amount or type of food, two-party authorization could be activated to prevent the order until proper authorization is received. In such situations, that is, when the location or possessor of the device is less uncertain, two-party authorization may be modified to require only single-party authorization Embodiments of two-party authorization may offer advantages in high-security scenarios. In such scenarios, user A's use of device 305 can be monitored and compared to a known behavior pattern of user A. The behavior pattern may relate to user A's use of device 305, or to other indicia such as user A's location at certain times. If the behavior pattern deviates sufficiently from the known behavior pattern, the security component may automatically notify a designated security person. This notification of the designated security person may be made known to user A, or not. And the designated security person may be asked to authorize the activity, or simply be informed of the activity. Additionally, even if the designated security person is asked to authorize the activity, that event—the asking and any subsequent authorization or non-authorization—may or may not be brought to the attention of user A. That is, user A may not be aware that the activity was brought to the attention of the security person. In such situations, it may be readily understood that the security person be other than one of buddies Bi enrolled for lost or stolen two-party authorization.

Embodiments of two-party authorization may offer advantages in parental guidance scenarios. In such scenarios, the use of device 305 by user A may be limited with certain uses of device 305 requiring approval by others. For example, user A may generally have use of device 305, except for pre-designated uses. For pre-designated uses, user A must request and receive approval. User A may be a child and the authorization may be from a parent or guardian, but embodiments envision that such a parental-approval relationship may describe any scenario in which user A of device 305 is being monitored or is otherwise not completely or solely responsible for the use of device 305.

The uses of device 305 in parental guidance and other scenarios may include accessing services or websites or applications. These uses may be categorized such that a particular use is on a "white list" (WL), "black list" (BL), or an "undecided list" (UL). In an embodiment, uses on the WL would not require subsequent authorization, uses on the BL would be prevented or denied, and uses on the UL would prompt a message to the guardian that requests authorization. The guardian may summarily allow or deny the use. But such requests may also prompt or provide for a dialogue between guardian and user A in which the guardian requests further information regarding the use, or information regarding why user A wishes to access the use. In such situations, the guardian may not be the same as, or may be a subset of, the buddies Bi enrolled for lost or stolen two-party authorization. Also, the guardian may not be removed or otherwise un-enrolled without the guardian's consent.

The embodiment described with reference to the parental guidance scenario above is a type of role-based access control (RBAC). In another type of role-based access control user A, for example an employee, requests to use device 305 to perform an activity on or with device 305 that is beyond the scope of activities allowed for user A. That scope may take the form of the WL, BL, and UL described above, where uses beyond the scope allowed for user A may be listed in either the BL or UL. When user A requests or attempts an activity that is beyond user A's scope, the security component sends an authorization request to a designated authorizing party. In an embodiment, the authorization request automatically includes an identification or description of the activity. The designated authorizing party may summarily allow or deny the use. But such requests may also prompt or provide for a dialogue between the designated authorizing party and user A in which the designated party requests further information regarding the use, or information regarding why user A wishes to access the use. As before, in such situations, the designated authorizing party may not be the same as, or may be a subset of, the buddies Bi enrolled for lost or stolen two-party authorization. For example, a designated authorizing party may be an administrator at user A's enterprise or organization, or a supervisor, or a co-worker, or the owner of the resource or service for which access was attempted. Also as before, a designated authorizing party may not be removed or otherwise un-enrolled without the designated authorizing party's consent.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A computer program product comprising computer-readable program code to be executed by one or more processors when retrieved from a non-transitory computer-readable medium, the program code including instructions to:
   receive a notification regarding a computing device;
   send at least one instruction, in response to the notification, to deny use of at least one computing device function until the computing device receives at least one instruction to permit the use of the at least one denied computing device function;
   receive a request from a requesting party to initiate an action on the computing device, the action requiring the use of the at least one denied computing device function;
   send, in response to the request, a message to a set of designated authorizing parties, the message regarding whether to permit the use of the at least one denied computing device function;
   authenticate a first party, the first party being from the set of designated authorizing parties;
   authenticate a second party, the second party being from the set of designated authorizing parties, the second party being different from the first party;
   receive authorization from the first party;
   receive authorization from the second party; and
   after successful authentications of the first and second parties and receipt of the authorization from the first party and receipt of the authorization from the second party, send at least one instruction to the computing device that permits the use of the at least one denied computing device function and permits the action requiring the use of the at least one denied computing device function.

2. The computer program product of claim 1, the sending at least one instruction to the computing device that permits the action requiring the use of the at least one denied computing device function including sending the request to the computing device.

3. The computer program product of claim 1, the sending at least one instruction to the computing device that permits the action requiring the use of the at least one denied computing device function including sending notice of the successful authentications of the first and second parties to the computing device.

4. The computer program product of claim 1, the action disabling at least one function on the computing device.

5. The computer program product of claim 1, the computing device including a smartphone; the action modifying the smartphone to render inoperable to an unauthorized user functions of the smartphone, the functions including: voice communications, text messaging, the ability to browse a network, and the ability to access and use mobile software applications; and at least a subset of the modifications made to the smartphone after accessing a device environment that provides protection from a hard reset to the subset of modifications.

6. The computer program product of claim 1, the authenticating the first party including the first party providing proof of knowledge of a first secret, the proof not including the first secret; the authenticating the second party including the second party providing proof of knowledge of a second secret, the proof not including the second secret; the computer program product further comprising instructions to provision a result of the first secret and a result of the second secret.

7. The computer program product of claim 6, the knowledge of a secret, provided by the party being authenticated, including a proof provisioned on the computing device or on a second server accessible by the first server.

8. The computer program product of claim 7, the proof including a private key.

9. The computer program product of claim 7, the proof being based on a password.

10. The computer program product of claim 6, the first party or the second party being a third party identity provider provided with the proof necessary to prove knowledge of the first secret or the second secret by an end user.

11. The computer program product of claim 10, the proof provided by the end user to the third party identify provider being stored by the third party identity provider in an escrow account.

12. The computer program product of claim 6, the computer program product further comprising instructions to: include the first secret or the second secret being provisioned on the computing device by a user:
   access a secure environment on the computing device, the secure environment bypassing a host operating system;
   open in the secure environment a user interface; and
   provide, using the user interface, the first secret.

13. The method of claim 1, the action including updating firmware.

14. A system comprising:
   one or more processors; and
   a non-transitory computer readable medium storing a plurality of instructions, which when executed, cause the one or more processors to:
   receive a notification regarding a computing device;
   send at least one instruction, in response to the notification, to deny use of at least one computing device function until the computing device receives at least one instruction to permit the use of the at least one denied computing device function;
   receive a request from a requesting party to initiate an action on the computing device, the action requiring the use of the at least one denied computing device function;
   send, in response to the request, a message to a set of designated authorizing parties, the message regarding whether to permit the use of the at least one denied computing device function;
   authenticate a first party, the first party being from the set of designated authorizing parties;
   authenticate a second party, the second party being from the set of designated authorizing parties, the second party being different from the first party;
   receive authorization from the first party;
   receive authorization from the second party; and
after successful authentications of the first and second parties and receipt of the authorization from the first party and receipt of the authorization from the second party, send at least one instruction to the computing device that permits the use of the at least one denied computing device function and permits the action requiring the use of the at least one denied computing device function.

15. The system of claim 14, the sending at least one instruction to the computing device that permits the action requiring the use of the at least one denied computing device function including sending the request to the computing device.

16. The system of claim 14, the sending at least one instruction to the computing device that permits the action requiring the use of the at least one denied computing device function including sending notice of the successful authentications of the first and second parties to the computing device.

17. The system of claim 14, the action disabling at least one function on the computing device.

18. The system of claim 14, the computing device including a smartphone; the action modifying the smartphone to render inoperable to an unauthorized user functions of the smartphone, the functions including: voice communications, text messaging, the ability to browse a network, and the ability to access and use mobile software applications; and at least a subset of the modifications made to the smartphone after accessing a device environment that provides protection from a hard reset to the subset of modifications.

19. The system of claim 14, the authenticating the first party including the first party providing proof of knowledge of a first secret, the proof not including the first secret; the authenticating the second party including the second party providing proof of knowledge of a second secret, the proof not including the second secret; the plurality of instructions further comprising instructions to provision a result of the first secret and a result of the second secret.

20. The system of claim 14, the action including updating firmware.

* * * * *